United States Patent
Uchida

(10) Patent No.: US 8,337,307 B2
(45) Date of Patent: Dec. 25, 2012

(54) COMPUTER-READABLE STORAGE MEDIUM HAVING STORED THEREIN MUSIC PERFORMANCE PROGRAM, MUSIC PERFORMANCE APPARATUS, MUSIC PERFORMANCE METHOD, AND MUSIC PERFORMANCE SYSTEM

(75) Inventor: Sanae Uchida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 118 days.

(21) Appl. No.: 13/026,602

(22) Filed: Feb. 14, 2011

(65) Prior Publication Data

US 2012/0129602 A1 May 24, 2012

(30) Foreign Application Priority Data

Nov. 18, 2010 (JP) ................................. 2010-257870

(51) Int. Cl.
*A63F 9/24* (2006.01)
(52) U.S. Cl. .......................................... 463/36; 463/37
(58) Field of Classification Search ................ 463/7, 30, 463/35, 36, 40, 42
See application file for complete search history.

(56) References Cited

U.S. PATENT DOCUMENTS

| 6,225,977 | B1 | 5/2001 | Li |
| 2009/0093315 | A1 | 4/2009 | Matsunaga et al. |

FOREIGN PATENT DOCUMENTS

| EP | 2 248 564 | 11/2001 |
| GB | 2 345 440 | 7/2000 |
| JP | 2000-37490 | 2/2000 |

*Primary Examiner* — Omkar Deodhar
(74) *Attorney, Agent, or Firm* — Nixon & Vanderhye P.C.

(57) ABSTRACT

A game apparatus repeatedly calculates a gravity center position based on load values detected by respective load sensors of a load controller. The game apparatus sequentially reproduces each of measures of a musical piece by reproducing a next measure when the gravity center position moves beyond a reference line. In this case, the game apparatus changes a reproduction sound volume in accordance with the gravity center position and a speed at which the gravity center moves.

24 Claims, 13 Drawing Sheets

F I G. 1 8
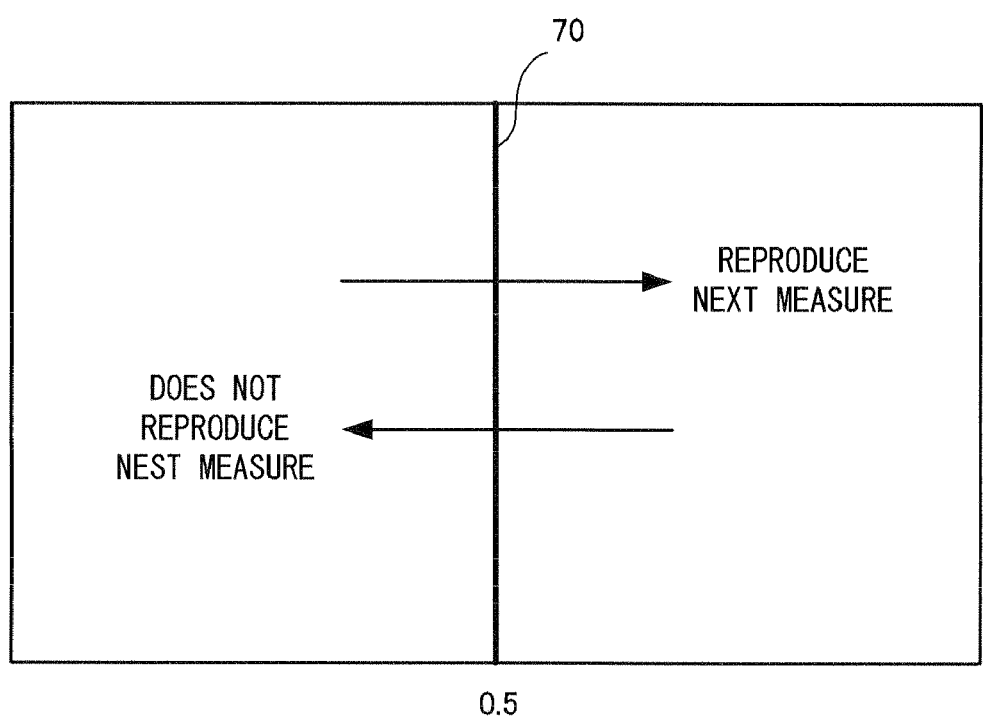

COMPUTER-READABLE STORAGE MEDIUM HAVING STORED THEREIN MUSIC PERFORMANCE PROGRAM, MUSIC PERFORMANCE APPARATUS, MUSIC PERFORMANCE METHOD, AND MUSIC PERFORMANCE SYSTEM

CROSS REFERENCE TO RELATED APPLICATION

The disclosure of Japanese Patent Application No. 2010-257870, filed on Nov. 18, 2010, is incorporated herein by reference.

BACKGROUND

1. Field

Example embodiments of the present invention relate to a computer-readable storage medium having stored therein a music performance program, a music performance apparatus, a music performance method, and a music performance system, and more specifically to a computer-readable storage medium having stored therein a music performance program, a music performance apparatus, a music performance method, and music performance system which perform music based on a movement of the gravity center of a user's body.

2. Description of the Background Art

Conventionally, there has been a dance game apparatus which requires a user to step on positions in accordance with instructions indicated by position indication marks scrolling on the screen, thereby allowing the user to step to music (for example, Japanese Laid-Open Patent Publication No. 2000-37490 (hereinafter referred to as Patent Literature 1)). Specifically, the dance game apparatus disclosed in Patent Literature 1 includes a plurality of stepping platforms, a loudspeaker for outputting music, and a display section for displaying stepping position marks. On the display section, the stepping position marks are displayed and scroll on the screen in accordance with progress of the music. Scores are calculated in accordance with a timing when a stepping position mark has moved to a predetermined position and a timing when a stepping platform corresponding to the stepping position mark has been stepped on.

However, the dance game apparatus disclosed in the above Patent Literature 1 allows a user to express his/her sense of rhythm by stepping on predetermined stepping positions in accordance with the progress of music, but does not allow the user to control the progress of music by using the whole or a part of his/her body. Consequently, the dance game apparatus disclosed in Patent Literature 1 does not allow, for example, the user to feel as if he/she is performing music. In addition, the game apparatus disclosed in Patent Literature 1 only detects the platforms being stepped on, and thus the user cannot satisfactorily reflect a movement of his/her whole body on a game.

SUMMARY

Therefore, example embodiments of the present invention provide a music performance apparatus, a music performance program, and the like which can perform music reflecting a movement of a user's body.

Example embodiments of the present invention may include the following features.

An embodiment of the present invention is directed to a computer-readable storage medium having stored therein a music performance program executed on a computer of a music performance apparatus which processes a signal from a load measuring device having a load sensor. The music performance program causes the computer to function as gravity center position obtaining means, determination means, and music reproduction means. The gravity center position obtaining means repeatedly obtains a gravity center position based on a signal from the load measuring device. The determination means determines whether a movement of the gravity center position obtained by the gravity center position obtaining means satisfies a predetermined condition. The music reproduction means sequentially reproduces a predetermined musical piece each time the determination means determines that a movement of the gravity center position satisfies the predetermined condition.

As described above, the predetermined musical piece is sequentially reproduced each time the movement of the gravity center position satisfies the predetermined condition. Accordingly, a user can control progress of music in accordance with a movement of his/her body. For example, in a case where the gravity center position moves beyond a predetermined line or a case where a moving speed of a gravity center (a speed at which the gravity center moves) is greater than or equal to a predetermined value, it can be determined that the movement of the gravity center position satisfies the predetermined condition if a moving pattern of the gravity center position coincides with a predetermined pattern.

In another aspect of example embodiments of the present invention, the determination means may determine whether to reproduce the predetermined musical piece in accordance with the gravity center position obtained by the gravity center position obtaining means having moved beyond a predetermined reference line. The music reproduction means sequentially reproduces the predetermined musical piece for a predetermined time each time the determination means determines to reproduce the predetermined musical piece.

As described above, it can be determined whether to reproduce the predetermined musical piece in accordance with the gravity center position having moved beyond the reference line, and the predetermined musical piece can be sequentially reproduced for the predetermined time each time the predetermined musical piece is determine to be reproduced. For example, a measure is reproduced when it is determined that the gravity center position has moved beyond the reference line, and a next measure is reproduced next time it is determined that the gravity center position has moved beyond the reference line. Accordingly, a movement of the user's body can control music reproduction.

In another aspect of example embodiments of the present invention, the determination means may determine whether a moving speed of the gravity center position calculated based on the gravity center position obtained by the gravity center position obtaining means is greater than or equal to a predetermined value. The music reproduction means sequentially reproduces the predetermined musical piece when the determination means determines that the moving speed of the gravity center position is greater than or equal to the predetermined value.

As described above, the predetermined musical piece can be sequentially reproduced when the moving speed of the gravity center position is determined to be greater than or equal to the predetermined value. Accordingly, the movement of the user's body can control music reproduction.

In another aspect of example embodiments of the present invention, the program may further cause the computer to function as sound volume setting means. The sound volume setting means sets a reproduction sound volume of the predetermined musical piece by using the gravity center position obtained by the gravity center position obtaining means. The music reproduction means reproduces the predetermined musical piece with the reproduction sound volume set by the sound volume setting means.

As described above, the reproduction sound volume of the predetermined musical piece can be set by using the gravity center position obtained by the gravity center position obtaining means. For example, the reproduction sound volume can be set in accordance with the gravity center position and the speed at which the gravity center moves. Accordingly, the reproduction sound volume can be changed in accordance with a movement of the gravity center position of the user.

In another aspect of example embodiments of the present invention, the program may further cause the computer to function as sound volume setting means. The sound volume setting means sets a reproduction sound volume of the predetermined musical piece based on a positional relationship between the predetermined reference line and the gravity center position obtained by the gravity center position obtaining means. The music reproduction means reproduces the predetermined musical piece with the reproduction sound volume set by the sound volume setting means.

As described above, the reproduction sound volume can be set in accordance with the gravity center position and can be changed based on a movement of the gravity center position of the user.

In another aspect of example embodiments of the present invention, the sound volume setting means may set the reproduction sound volume so as to be increased as a distance between the predetermined reference line and the gravity center position increases.

As described above, the sound volume can be increased as the distance between the gravity center position and the reference line increases, and the sound volume can be increased in accordance with a stepping strength of the user. Accordingly, the user can adjust the reproduction sound volume, for example, in the same manner as that in a reed organ which produces a loud sound when a pedal is stepped on strongly, and thus the user can feel as if he/she is playing a reed organ.

In another aspect of example embodiments of the present invention, the sound volume setting means may set, when the gravity center position is not within a predetermined region that includes the predetermined reference line, the reproduction sound volume to a first sound volume; and set when the gravity center position is within the predetermined region, the reproduction sound volume to a sound volume which is lower than the first sound volume.

As described above, when gravity center position crosses the predetermined region that includes the reference line, the reproduction sound volume is set to the first sound volume; and when the gravity center position is within the predetermined region, the reproduction sound volume can be set so as to be lower than the first sound volume. Accordingly, when the distance between the gravity center position and the reference line is greater than or equal to a predetermined value, the sound volume is fixed at a maximum value, and when the distance between the gravity center position and the reference line is less than a predetermined value, the sound volume can be set to a value smaller than the maximum value.

In another aspect of example embodiments of the present invention, the sound volume setting means may determine a sound volume upper limit in accordance with the distance between the predetermined reference line and the gravity center position; and set the reproduction sound volume so as to be within the sound volume upper limit in accordance with a moving speed of the gravity center position calculated based on the gravity center position obtained by the gravity center position obtaining means.

As described above, the reproduction sound volume can be set in accordance with the gravity center position and the moving speed of the gravity center. For example, even when the moving speed of the gravity center is relatively high, the reproduction sound volume can be set so as to be decreased if the gravity center position moves in a range relatively close to the reference line.

In another aspect of example embodiments of the present invention, the sound volume setting means may set the reproduction sound volume in accordance with a moving speed of the gravity center position calculated based on the gravity center position obtained by the gravity center position obtaining means.

As described above, the reproduction sound volume can be set in accordance with the moving speed of the gravity center, and reproduction sound volume can be changed in accordance with the moving speed of the gravity center position of the user.

In another aspect of example embodiments of the present invention, the sound volume setting mean may set the reproduction sound volume so as to be increased as the moving speed of the gravity center position increases.

As described above, the sound volume can be set so as to be increased as the moving speed of the gravity center increases. Accordingly, for example, the user can adjust the sound volume in the same manner as that of a reed organ.

In another aspect of example embodiments of the present invention, the music reproduction means may change the current reproduction sound volume gradually to the reproduction sound volume set by the sound volume setting means during the course of a predetermined time, and reproduces the predetermined musical piece.

As described above, rapid change of the reproduction sound volume can be prevented.

In another aspect of example embodiments of the present invention, the program may cause the computer to further function as reproduction speed setting means. The reproduction speed setting means sets a reproduction speed of the predetermined musical piece based on a moving speed of the gravity center position calculated based on the gravity center position obtained by the gravity center position obtaining means. The music reproduction means reproduces the predetermined musical piece at the reproduction speed set by the reproduction speed setting means.

As described above, the reproduction speed (tempo) of music can be changed based on the moving speed of the gravity center.

In another aspect of example embodiments of the present invention, the reproduction speed setting means may set the reproduction speed so as to be increased as the moving speed of the gravity center position increases.

As described above, the reproduction speed (tempo) of music can be set so as to be faster as the moving speed of the gravity center increases, and the tempo of the music can keep pace with the movement of the user.

In another aspect of example embodiments of the present invention, the program may cause the computer to further function as time measurement means and reproduction speed setting means. The time measurement means measures a time period starting from when the determination means determines to reproduce the predetermined musical piece to when the determination means previously determines to reproduce the predetermined musical piece next time. The reproduction speed setting means sets a reproduction speed of the predetermined musical piece based on the time period measured by the time measurement means. The music reproduction means reproduces the predetermined musical piece at the reproduction speed set by the reproduction speed setting means.

As described above, the reproduction speed (tempo) of music can be change d based on the time period measured by the time measurement means.

In another aspect of example embodiments of the present invention, the reproduction speed setting may set the reproduction speed so as to be increased as the time period measured by the time measurement means decreases.

As described above, for example, when the user moves fast, the reproduction speed of music can be fast, and thus the tempo of music can keep pace with the movement of the user.

In another aspect of example embodiments of the present invention, the determination means may determine, in a situation where the gravity center position moves beyond the predetermined reference line, to reproduce the predetermined musical piece only when the gravity center position moves from one side to the other side beyond the predetermined reference line.

As described above, in a situation where the gravity center position moves beyond the reference line, the predetermined musical piece can be sequentially reproduced for a predetermined time each time only when the moving direction of the gravity center position is a constant direction.

In another aspect of example embodiments of the present invention, the program may cause the computer to further function as load value obtaining means which repeatedly obtains a load value on the load measuring device based on the signal from the load measuring device. The music reproduction means reproduces the predetermined musical piece only when the load value obtained by the load value obtaining means is greater than or equal to a predetermined value.

As described above, for example, the predetermined musical piece can be reproduced only when a load is applied on the load measuring device.

The music reproduction means sequentially reproduces the predetermined musical piece for a predetermined time each time the determination means determines that the movement of the gravity center position satisfies the predetermined condition.

As described above, the predetermined musical piece can be sequentially reproduced for the predetermined time each time.

In another aspect of example embodiments of the present invention, the predetermined musical piece is divided at regular intervals.

As described above, for example, each of the measures of the predetermined musical piece can be sequentially reproduced.

In another aspect of example embodiments of the present invention, the predetermined musical piece may be divided at into each note. The music reproduction means sequentially reproduces each note of the predetermined musical piece each time the determination means determines to reproduce the predetermined musical piece.

As described above, each note of the predetermined musical piece can be sequentially reproduced.

In another aspect of example embodiments of the present invention, the load measuring device may include a plurality of load sensors. The gravity center position obtaining means calculates the gravity center position based on the load value detected by each of the plurality of load sensors.

As described above, the gravity center position can be calculated by using the plurality of load sensors.

Further, example embodiments of the present invention may be implemented in the form of a music performance apparatus which executes the music performance program. Further, example embodiments of the present invention may be configured as an information process system in which a plurality of elements which respectively realize the above described means interoperate with one another. The information process system may be configured by a single device or may be configured by a plurality of devices connected with one another via a network or the like.

According to example embodiments of the present invention, music can be performed reflecting a movement of a user.

These and other features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 18 is a figure showing how each of measures is sequentially reproduced in accordance with a moving direction in another embodiment.

DESCRIPTION OF THE EXAMPLE EMBODIMENTS

[Overall Configuration of Game System]

Figure 1:
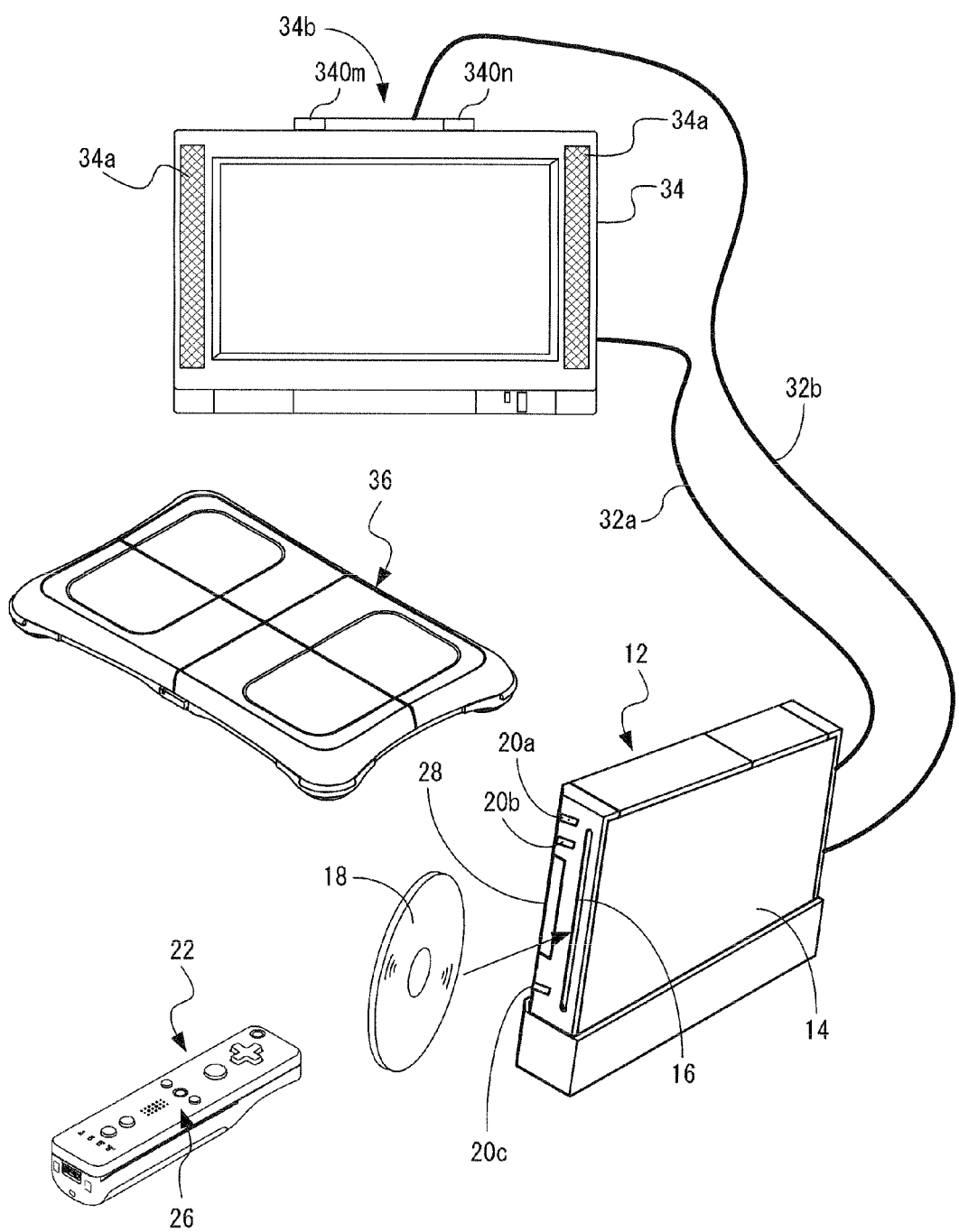
FIG. 1 is an external view of a game system according to an embodiment of the present invention.

Next, an embodiment of the present invention will be described with reference to the accompanying drawings. FIG. 1 is an external view of a game system according to the embodiment of the present invention. The game system 10 includes a game apparatus 12, a controller 22, and a load controller 36. It is noted that the game apparatus 12 of the present embodiment is designed to communicate with up to four controllers (22, 36), although not shown. Further, the game apparatus 12 and each controller (22, 36) are connected with each other in a wireless manner. For example, wireless communication is executed in accordance with the Bluetooth (registered trademark) standard, or alternatively, may be executed in accordance with other standards, such as infrared, wireless LAN or the like.

The game apparatus 12 includes a substantially parallelepiped-shaped housing 14. A disc slot 16 is provided in a front surface of the housing 14. An optical disc 18 which is an example of an information storage medium having stored therein a game program or the like is inserted and loaded through the disc slot 16 into a disc drive 54 (see FIG. 2) in the housing 14. An LED and a light guide plate are provided around the disc slot 16 and can be turned ON in response to various processes.

Also, a power button 20a and a reset button 20b are provided in an upper portion of the front surface of the game apparatus 12, and an eject button 20c is provided in a lower portion thereof. Moreover, a connector cover 28 for an external memory card is provided between the reset button 20b and the eject button 20c and in the vicinity of the disc slot 16. A connector 62 for an external memory card (see FIG. 2) is provided inside the external memory card connector cover 28. An external memory card (hereinafter simply referred to as a "memory card" (not shown)) is inserted into the connector 62. The memory card is utilized to load and temporarily store a game program or the like read out from the optical disc 18, or to store (save) game data (result data or intermediate data of a game) of a game played using the game system 10. Note that the game data may be stored into, for example, an internal memory, such as a flash memory 44 (see FIG. 2), which is provided in the game apparatus 12, instead of the memory card. Also, the memory card may be used as a backup memory for the internal memory.

Note that, as the memory card, a general-purpose SD card can be used, or alternatively, other general-purpose memory cards, such as a memory stick (registered trademark) and a multimedia card (registered trademark), can be used.

An AV cable connector 58 (see FIG. 2) is provided in a rear surface of the housing 14 of the game apparatus 12. The AV cable connector 58 is used to connect a monitor 34 and loudspeakers 34a to the game apparatus 12 via an AV cable 32a. The monitor 34 and the loudspeakers 34a may be typically of a color television set. The AV cable 32a allows a video signal and an audio signal from the game apparatus 12 to be input to a video input terminal and an audio input terminal of the color television, respectively. Therefore, a game image of a three-dimensional (3D) video game is displayed on a screen of the color television (monitor) 34, and stereo game audio, such as game music or sound effects, is output from the right and left loudspeakers 34a. Also, a marker unit 34b including two infrared LEDs (markers) 340m and 340n is provided in the vicinity of the monitor 34 (in the present embodiment, an upper portion of the monitor 34). The marker unit 34b is connected via a power supply cable 32b to the game apparatus 12. Therefore, power is supplied from the game apparatus 12 to the marker unit 34b. As a result, the markers 340m and 340n perform light emission and output infrared light toward the front of the monitor 34.

Note that power for the game apparatus 12 is supplied from a typical AC adapter (not shown). The AC adapter is plugged into a standard home wall socket. The game apparatus 12 converts home power supply (commercial power supply) into a low DC voltage signal suitable for driving. In other embodiments, a battery may be used as a power supply.

In the game system 10, when a user or users desire to play a game (or other applications rather than games), the user initially powers ON the game apparatus 12, and then selects an appropriate optical disc 18 having stored therein a program of a video game (or another application which the user desires to play), and loads the optical disc 18 into the disc drive 54 of the game apparatus 12. In response to this, the game apparatus 12 starts executing the video game or another application based on a program recorded on the optical disc 18.

The user operates the controller 22 so as to give an input to the game apparatus 12. For example, by operating any of a plurality of input means 26, the game or another application is started. Also, in addition to operations to the input means 26, by moving the controller 22 itself, a moving image object (user object) can be moved in different directions, or a point of view (camera position) of the user in a 3D game world can be changed. An acceleration sensor (not shown) for detecting acceleration in three axis directions is provided in the controller 22, and acceleration caused by the user moving the controller 22 can be detected. The game apparatus 12 can perform a predetermined game process in accordance with acceleration obtained from the controller 22. Moreover, an imaging means for imaging infrared light emitted from the markers 340m and 340n is provided in the controller 22, and thereby the controller 22 functions also as a pointing input device for pointing a position on the screen of the monitor 34.

Figure 2:
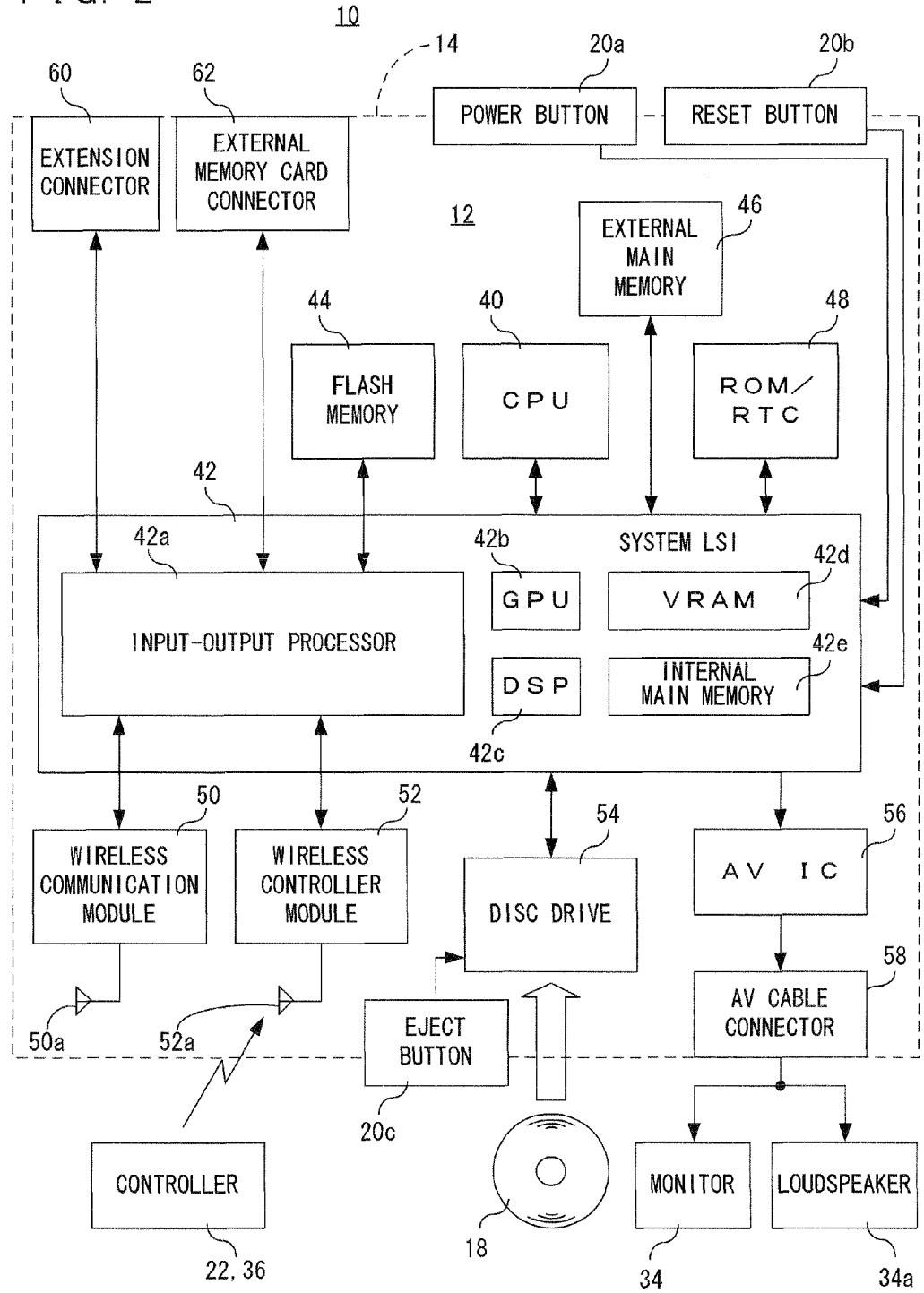
FIG. 2 is a block diagram showing an electric configuration of a video game system 10 of the present embodiment.

FIG. 2 is a block diagram showing an electrical configuration of the video game system 10 of the present embodiment. Components in the housing 14 are mounted to a printed board, though not shown. As shown in FIG. 2, the game apparatus 12 includes a CPU 40. The CPU 40 functions as a game processor. A system LSI 42 is connected to the CPU 40. An external main memory 46, a ROM/RTC 48, a disc drive 54 and an AV IC 56 are connected to the system LSI 42.

The external main memory 46 stores a program, such as a game program or the like, or various kinds of data, or serves as a work area or a buffer area for the CPU 40. The ROM/RTC 48 is a so-called boot ROM, in which a program for booting the game apparatus 12 is incorporated and a clock circuit for counting time is provided. The disc drive 54 reads out program data, texture data or the like from the optical disc 18, and writes data into an internal main memory 42e (described below) or the external main memory 46 under the control of the CPU 40.

The system LSI 42 includes an input-output processor 42a, a GPU (Graphics Processor Unit) 42b, a DSP (Digital Signal Processor) 42c, a VRAM 42d, and the internal main memory 42e, which are connected to each other via an internal bus (not shown).

The input/output processor (I/O processor) 42a executes transmission/reception or downloading of data. The data transmission/reception or downloading will be described in detail below.

The GPU 42b, which is a part of a drawing means, receives a graphics command (drawing command) from the CPU 40, and generates game image data in accordance with the command. Note that the CPU 40 gives the GPU 42b an image generating program required for generation of the game image data in addition to the graphics command.

The VRAM 42d is connected to the GPU 42b as described above, though not shown. The GPU 42b accesses the VRAM 42d to acquire data (image data: polygon data, texture data, etc.) required for execution of the drawing command. Note that the CPU 40 writes image data required for drawing, into the VRAM 42d via the GPU 42b. The GPU 42b access the VRAM 42d to generate game image data for drawing.

Note that it is assumed in the present embodiment that the GPU 42*b* generates game image data. When any application other than game applications is executed, the GPU 42*b* generates image data for the application.

The DSP 42*c*, which functions as an audio processor, generates audio data corresponding to sound, speech or music which is to be output from the loudspeakers 34*a*, using sound data, sound waveform (tone color) data or the like stored in the internal main memory 42*e*, the external main memory 46 or the like.

The image data and audio data thus generated are read out by the AV IC 56, and are then output via the AV connector 58 to the monitor 34 and the loudspeakers 34*a*, respectively. Therefore, a game screen is displayed on the monitor 34 while sound (music) required for a game is output from the loudspeakers 34*a*.

The flash memory 44, a wireless communication module 50, and a wireless controller module 52 as well as an extension connector 60 and the external memory card connector 62 are connected to the input/output processor 42*a*. An antenna 50*a* is connected to the wireless communication module 50. An antenna 52*a* is connected to the wireless controller module 52.

The input/output processor 42*a* can communicate with other game apparatuses or various servers connected to a network via the wireless communication module 50. Note that the input/output processor 42*a* can directly communicate with other game apparatuses without via a network. The input/output processor 42*a* regularly accesses the flash memory 44 to detect the presence or absence of data (transmission data) that needs to be transmitted to the network. If there is the transmission data, the input/output processor 42*a* transmits the transmission data via the wireless communication module 50 and the antenna 50*a* to the network. The input/output processor 42*a* also receives data (received data) transmitted from another game apparatus via the network, the antenna 50*a* and the wireless communication module 50, and stores the received data into the flash memory 44. Note that, in a certain case, the received data is directly discarded. Moreover, the input/output processor 42*a* receives data (downloaded data) downloaded from a download server via the network, the antenna 50*a* and the wireless communication module 50, and stores the downloaded data into the flash memory 44.

The input/output processor 42*a* also receives input data transmitted from the controller 22 or the load controller 36 via the antenna 52*a* and the wireless controller module 52, and stores (temporarily stores) the input data into a buffer area of the internal main memory 42*e* or the external main memory 46. The input data is utilized in a game process performed by the CPU 40 before being erased from the buffer area.

Note that, in the present embodiment, as described above, the wireless controller module 52 communicates with the controller 22 and the load controller 36 in accordance with the Bluetooth standard.

In FIG. 2, the controller 22 and the load controller 36 are shown as a single unit for the sake of convenience.

Also, the extension connector 60 and the external memory card connector 62 are connected to the input/output processor 42*a*. The extension connector 60 is a connector for interface, such as USB or SCSI. A medium (e.g., an external storage medium, etc.) or a peripheral device (e.g., another controller, etc.) can be connected to the extension connector 60. A wired LAN adapter can be connected to the extension connector 60, so that a wired LAN can be used instead of the wireless communication module 50. An external storage medium, such as a memory card or the like, can be connected to the external memory card connector 62. Therefore, for example, the input/output processor 42*a* can access an external storage medium via the extension connector 60 or the external memory card connector 62 to save or read out data.

As also shown in FIG. 1, the game apparatus 12 (housing 14) is provided with the power button 20*a*, the reset button 20*b*, and the eject button 20*c*. The power button 20*a* is connected to the system LSI 42. When the power button 20*a* is turned ON, power is supplied via the AC adapter (not shown) to each component of the game apparatus 12, so that the system LSI 42 is set to be in a normal conductive state (hereinafter referred to as a "normal mode"). On the other hand, when the power button 20*a* is turned OFF, power is supplied only to some of the components of the game apparatus 12, and the system LSI 42 is set to be in a mode in which power consumption is suppressed to a minimum level (hereinafter referred to as a "standby mode"). In the present embodiment, in the standby mode, the system LSI 42 outputs an instruction to stop power supply to components other than the input/output processor 42*a*, the flash memory 44, the external main memory 46, the ROM/RTC 48, the wireless communication module 50, and the wireless controller module 52. Therefore, in the standby mode, the CPU 40 does not execute an application.

Although power is supplied to the system LSI 42 even in the standby mode, a clock is not supplied to the GPU 42*b*, the DSP 42*c* or the VRAM 42*d* so that they are not driven, resulting in a decrease in power consumption.

Moreover, a fan for discharging heat of ICs, such as the CPU 40, the system LSI 42 and the like, is provided in the housing 14 of the game apparatus 12, though not shown. The fan is also stopped in the standby mode.

Note that, when the standby mode is not desired, then if the system LSI 42 is set so that the standby mode is not to be used, power supply to all circuit components is completely stopped when the power button 20*a* is turned OFF.

The normal mode and the standby mode can be switched by turning ON/OFF a power switch (one of the switches of the input means 26) of the controller 22 or by a remote operation. When the remote operation is not performed, the system LSI 42 may be set so that power is not supplied to the wireless controller module 52*a* in the standby mode.

The reset button 20*b* is also connected to the system LSI 42. When the reset button 20*b* is pressed, the system LSI 42 reboots the boot program of the game apparatus 12. The eject button 20*c* is connected to the disc drive 54. When the eject button 20*c* is pressed, the optical disc 18 is ejected from the disc drive 54.

Figure 3:
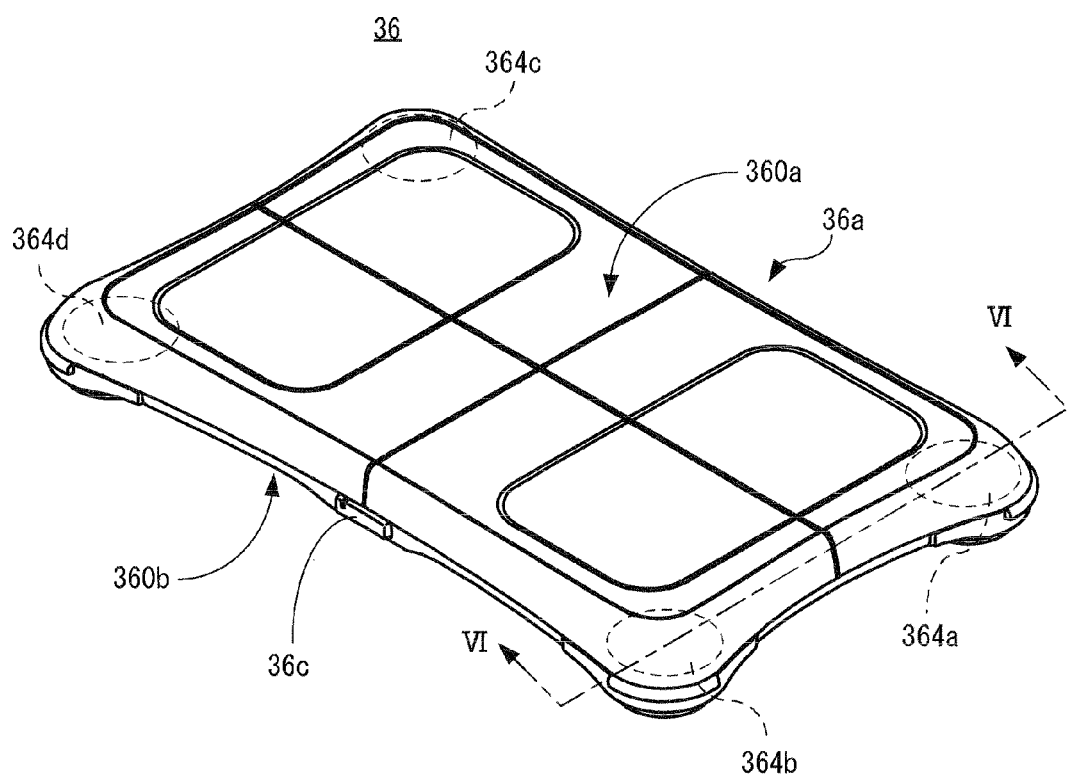
FIG. 3 is a perspective view showing an external appearance of a load controller 36 shown in FIG. 1.

FIG. 3 is a perspective external view of the load controller 36 of FIG. 1. As shown in. FIG. 3, the load controller 36 includes a platform 36a on which the user stands (the user puts their foot or feet thereon), and at least four load sensors 364 (364*a* to 364*d*) for detecting a load on the platform 36*a*. Note that each load sensor 364 is provided inside the platform 36*a* (see FIG. 4) and is shown with a dashed line in FIG. 3.

The platform 36*a* is formed in the shape of substantially a rectangular parallelepiped, and is in the shape of substantially a rectangle as viewed from the top. For example, the short side and the long side of the rectangle are set to about 30 cm and about 50 cm, respectively. The platform 36*a* has a flat upper surface on which the user stands. The platform 36*a* has four corner side surfaces each partially sticking out in a cylindrical shape.

In the platform 36*a*, the four load sensors 364 are arranged at predetermined intervals. In the present embodiment, the four load sensors 364 are arranged in a periphery of the platform 36*a*, Specifically, at the respective four corners. The intervals at which the load sensors 364 are arranged are set to appropriate values which allow accurate detection of what is intended by a game operation depending on the way in which the user puts a load onto the platform 36a.

Figure 4:
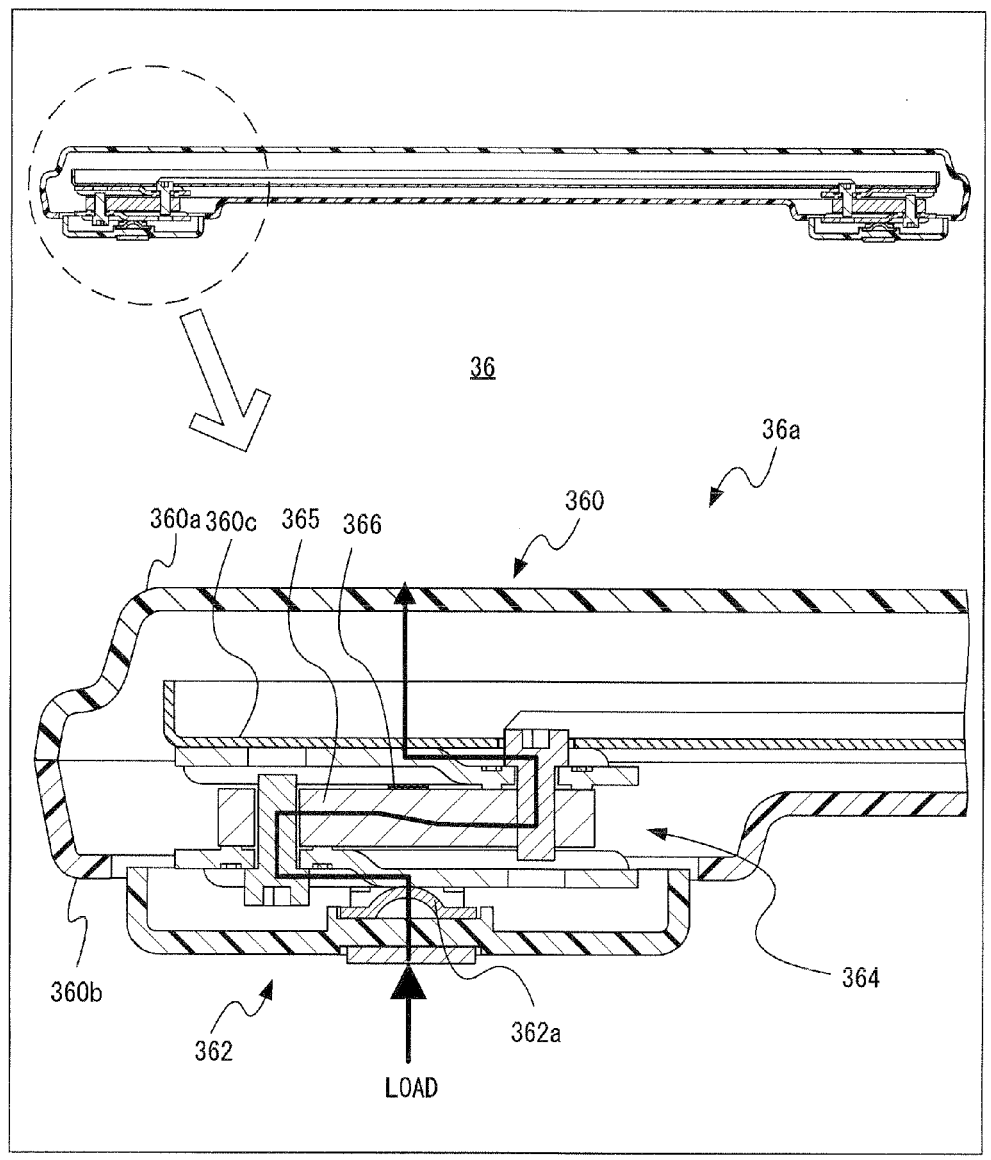
FIG. 4 is a sectional view taken along a line VI-VI of the load controller 36 shown in FIG. 3.

FIG. 4 shows a cross-sectional view of the load controller 36 taken along line VI-VI of FIG. 3 and an enlarged view of a corner portion of the load controller 36 in which a load sensor 364 is provided. As can be seen from FIG. 4, the platform 36a includes a support plate 360 on which the user stands, and legs 362. The legs 362 are provided at portions where the load sensors 364 are arranged. In the present embodiment, since the four load sensors 364 are arranged at the four corners, the four legs 362 are also provided at the four corners. Each leg 362 is formed by plastic molding in the shape of substantially a cylinder with a base. The load sensors 364 are each provided on a spherical part 362a provided on the base of the corresponding leg 362. The support plate 360 is supported by the legs 362 with the load sensors 364 being interposed therebetween.

The support plate 360 includes an upper plate 360a forming an upper surface and an upper side surface portion, a lower plate 360b forming a lower surface and a lower side surface portion, and an intermediate plate 360c provided between the upper plate 360a and the lower plate 360b. The upper plate 360a and the lower plate 360b are formed by, for example, plastic molding, and are integrated using an adhesive or the like. The intermediate plate 360c is, for example, formed of a single metal plate by press forming. The intermediate plate 360c is fixed onto the four load sensors 364. The upper plate 360a has a grid-patterned rib (not shown) on a lower surface thereof. The upper plate 360a is supported by the intermediate plate 360c with the rib being interposed therebetween. Therefore, when the user stands on the platform 36a, the load is transferred to the support plate 360, the load sensors 364 and the legs 362. As indicated with arrows in FIG. 4, reactions from a floor generated by the input load are transferred from the legs 362 via the spherical parts 362a, the load sensors 364 and the intermediate plate 360c to the upper plate 360a.

Each load sensor 364 is, for example, a strain gauge (strain sensor) load cell, which is a load transducer which converts an input load to an electrical signal. In the load sensor 364a strain-generating body 365 is deformed, depending on an input load, resulting in strain. The strain is converted into a change of electrical resistance and is then converted into a change of voltage by a strain sensor 366 attached to the strain-generating body. Therefore, the load sensor 364 outputs a voltage signal indicating the input load, from an output terminal thereof.

Note that the load sensor 364 may be of other types, such as a tuning fork type, a string vibration type, an electrostatic capacitance type, a piezoelectric type, a magnetostrictive type, and a gyroscopic type.

Referring back to FIG. 3, the load controller 36 further includes a power button 36c. When the power button 36c is turned ON, power is supplied to each circuit component (see FIG. 5) of the load controller 36. Note that the load controller 36 may be powered ON in accordance with an instruction from the game apparatus 12. Also, the load controller 36 is powered OFF if a state in which the user does not stand on the load controller 36 continues for a predetermined period of time (e.g., 30 sec) or more. Note that, when the load controller 36 is in the active state, then if the power button 36c is turned ON, the load controller 36 may be powered OFF.

Figure 5:
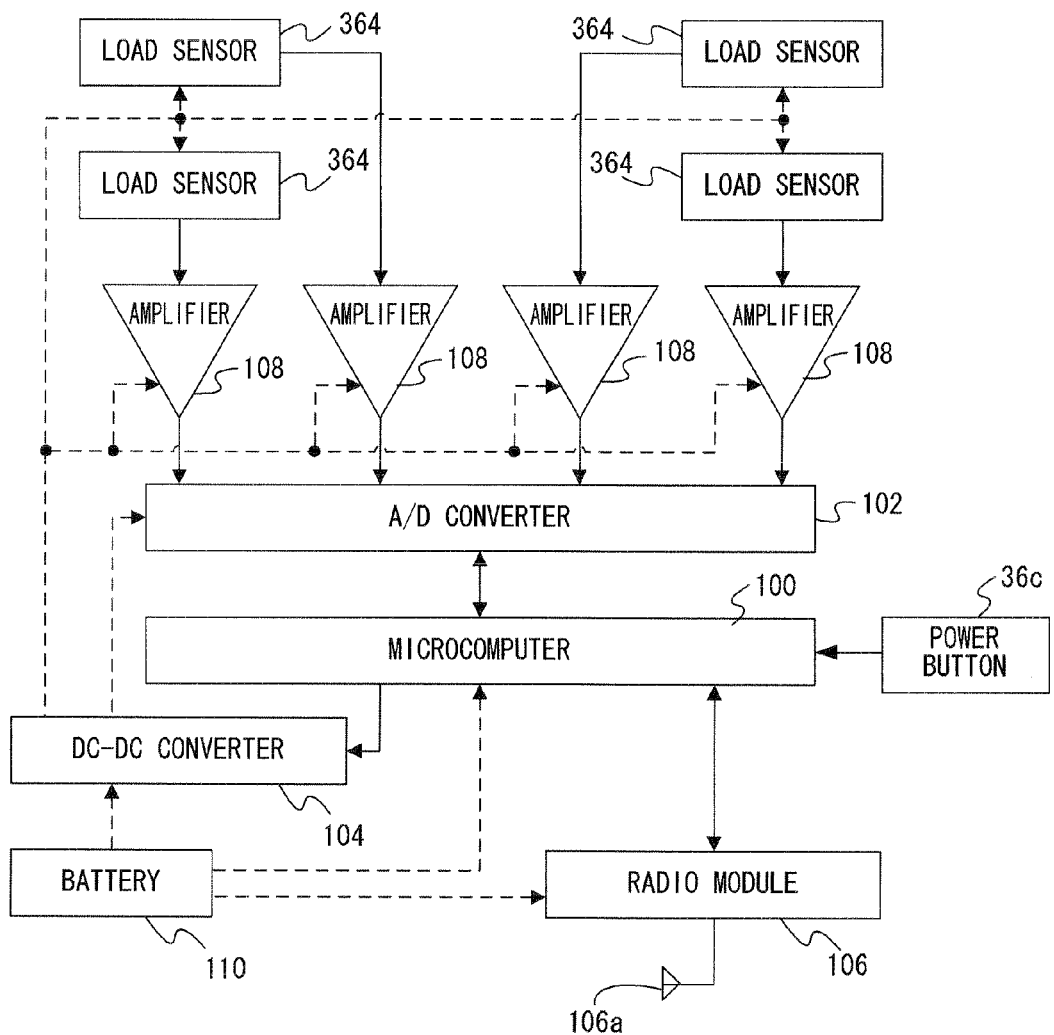
FIG. 5 is a block diagram showing an example of the electric configuration of the load controller 36.

FIG. 5 is a block diagram showing an exemplary electrical configuration of the load controller 36. Note that signal and communication flows are indicated by solid lines with an arrow or arrows in FIG. 5. Dashed lines with an arrow or arrows indicate supply of power.

The load controller 36 includes a microcomputer 100 for controlling the operation of the load controller 36. The microcomputer 100 includes a CPU, a ROM, a RAM and the like (not shown). The CPU controls the operation of the load controller 36 in accordance with a program stored in the ROM.

The power button 36c, an A/D converter 102, a DC-DC converter 104, and a radio module 106 are connected to the microcomputer 100. Moreover, an antenna 106a is connected to the radio module 106. The four load sensors 364 are connected via respective amplifiers 108 to the A/D converter 102.

The load controller 36 also accommodates a battery 110 for supplying power. In other embodiments, an AC adapter may be connected to the load controller 36 instead of the battery so that commercial power is supplied to the load controller 36. In this case, a power supply circuit which converts alternating current into direct current and decreases and rectifies direct voltage needs to be provided instead of the DC-DC converter. In the present embodiment, power is supplied directly from the battery 110 to the microcomputer 100 and the radio module 106. In other words, power is invariably supplied to a portion (CPU) of the components of the microcomputer 100 and the radio module 106 so as to determine whether or not the power button 36c has been turned ON or whether or not a command to power ON (detection of a load) has been transmitted from the game apparatus 12. On the other hand, power is supplied to the load sensors 364, the A/D converter 102 and the amplifiers 108 from the battery 110 via the DC-DC converter 104. The DC-DC converter 104 converts the voltage value of the direct current from the battery 110 to a different voltage value, and supplies the resultant power to the load sensors 364, the A/D converter 102 and the amplifiers 108.

The supply of power to the load sensors 364, the A/D converter 102 and the amplifiers 108 may be performed as required by the microcomputer 100 controlling the DC-DC converter 104. Specifically, the microcomputer 100, when determining that it is necessary to operate the load sensors 364 to detect a load, may control the DC-DC converter 104 to supply power to the load sensors 364, the A/D converter 102 and the amplifiers 108.

When power is supplied to the load sensors 364, each load sensor 364 outputs a signal indicating a load input thereto. The signals are amplified by the respective amplifiers 108, and are converted from analog signals into digital data by the A/D converter 102. The digital data is input to the microcomputer 100. A detected value of each load sensor 364 is given identification information of the load sensor 364. Therefore, each load sensor 364 can be identified from a corresponding detected value. Thus, the microcomputer 100 can acquire data indicating detected load values at the same time of the four load sensors 364.

On the other hand, the microcomputer 100, when determining that it is not necessary to operate the load sensors 364 (i.e., it is not the timing of load detection), controls the DC-DC converter 104 to stop the supply of power to the load sensors 364, the A/D converter 102 and the amplifiers 108. Thus, the load controller 36 can operate the load sensors 364 to detect a load only when it is required, whereby power consumption for load detection can be suppressed.

The load detection is typically required when the game apparatus 12 (FIG. 1) needs to acquire load data. For example, the game apparatus 12, when requiring load information, transmits a load acquisition command to the load controller 36. The microcomputer 100, when receiving the load acquisition command from the game apparatus 12, controls the DC-DC converter 104 to supply power to the load sensors 364 and the like so as to detect a load. On the other hand, the microcomputer 100, when not receiving the load acquisition command from the game apparatus 12, controls the DC-DC converter 104 to stop supply of power.

Alternatively, the microcomputer 100 may determine that load detection timing occurs at predetermined intervals and control the DC-DC converter 104. When the load detection is thus periodically performed, cycle information may be initially supplied and stored from the game apparatus 12 into the microcomputer 100 of the load controller 36 or may be previously stored in the microcomputer 100, for example.

Data indicating detected values from the load sensors 364 is transmitted as operation data (input data) of the load controller 36 from the microcomputer 100 via the radio module 106 and an antenna 106b to the game apparatus 12 (FIG. 1). For example, when receiving a command from the game apparatus 12 and performing the load detection, then if receiving detected value data of the load sensors 364 from the A/D converter 102, the microcomputer 100 transmits the detected value data to the game apparatus 12. Alternatively, the microcomputer 100 may transmit detected value data to the game apparatus 12 at predetermined intervals. If the cycle of the transmission is longer than the cycle of the load detection, data containing load values which are detected at a plurality of detection timings until the next transmission timing is transmitted.

Note that the radio module 106 can perform communication in accordance with the same wireless standard. (Bluetooth (registered trademark), wireless LAN, etc.) as that of the wireless controller module 52 of the game apparatus 12. Therefore, the CPU 40 of the game apparatus 12 can transmit the load acquisition command via the wireless controller module 52 and the like to the load controller 36. The microcomputer 100 of the load controller 36 can receive the command via the radio module 106 and the antenna 106a from the game apparatus 12, and transmit input data containing a detected load value (or a calculated load value) of each load sensor 364 to the game apparatus 12.

For example, in a game which is executed based on a simple sum of four load values detected by the four load sensors 364, the user is permitted to stand at any position with respect to the four load sensors 364 of the load controller 36, i.e., the user is permitted to stand on the platform 36a at any position and in any orientation to play a game. In some kinds of games, however, the direction of a load value detected by each load sensor 364a viewed from the user needs to be identified, i.e., a positional relationship between the four load sensors 364 of the load controller 36 and the user needs to be recognized. In this case, for example, the positional relationship between the four load sensors 364 and the user may be previously defined, and the user may be supposed to stand on the platform 36a in a manner which allows the predetermined positional relationship. Typically, a positional relationship in which there are two load sensors 364 in front of, behind, to the right of, and to the left of the user standing at a middle of the platform 36a, i.e., a positional relationship in which, when the user stands at a middle of the platform 36a of the load controller 36, there is a load sensor 364 in front right, front left, rear right and rear left directions with respect to the user as a center, is defined. In this case of the present embodiment, the platform 36a of the load controller 36 is in the shape of a rectangle as viewed from the top and the power button 36c is provided at one side (long side) of the rectangle. Therefore, it is previously ruled that the user should stand on the platform 36a using the power button 36c as a guide in a manner which allows the long side at which the power button 36c is provided to be located in a predetermined direction (front, rear, left or right). In this case, a load value detected by each load sensor 364 is a load value of a predetermined direction (front right, front left, rear right, and rear left) as viewed from the user. Therefore, the load controller 36 and the game apparatus 12 can find out a direction to which each detected load value corresponds as viewed from the user, based on the identification information of the load sensors 364 contained in the detected load value data and arrangement data indicating previously set (stored) positions or directions of the load sensors 364 with respect to the user. As a result, for example, it is possible to recognize what is intended by a game operation input by the user, such as forward, backward, rightward and leftward operation directions and the like.

Note that the arrangement of the load sensors 364 with respect to the user may not be previously defined, and may be input and set by the user during initial setting or during a game. For example, a screen may be displayed which instructs the user to stand on a portion in a predetermined direction (front left, front right, rear left, rear right, etc.) as viewed from the user, and load values may be acquired, so that a positional relationship between the load sensors 364 and the user can be specified, and therefore, arrangement data may be generated and stored based on these settings. Alternatively, a screen for selecting an arrangement of the load controllers 36 may be displayed on the monitor 34 to cause the user to select a direction in which a guide (the power button 36c) is located as viewed from the user by an input using the controller 22. Arrangement data of the load sensors 364 may be generated and stored based on the selection.

(First Embodiment)
(General Outline of Game Process)

Figure 6:
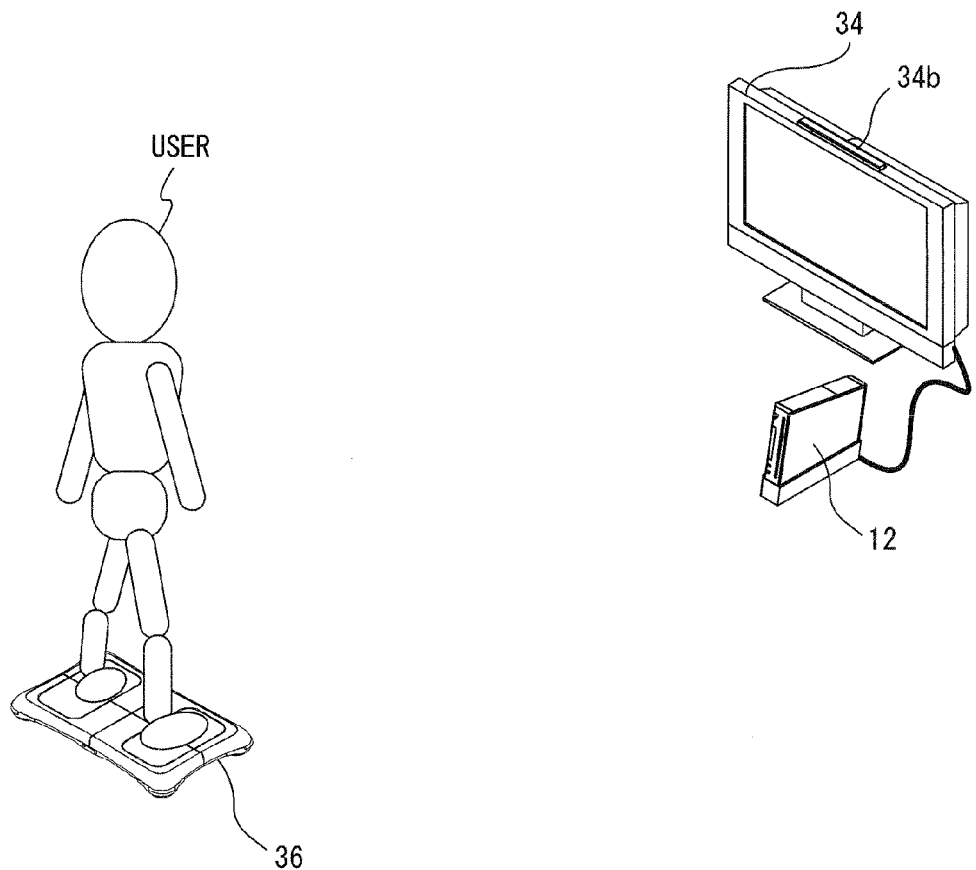
FIG. 6 is a diagram showing how a user stands on the load controller 36 and plays a game according to the present embodiment.

Next, an outline of a game process according to an embodiment of the present invention will be described with reference to FIGS. 6 to 11. FIG. 6 is a diagram showing an appearance in which a user stands on a load controller 36 and plays a game according to the present embodiment. As shown in FIG. 6, the user stands on the load controller 36 while facing a screen of the monitor 34. The load controller 36 is placed such that the longitudinal direction thereof is perpendicular to the direction toward the screen (which is referred to as a crosswise placement).

Figure 7:
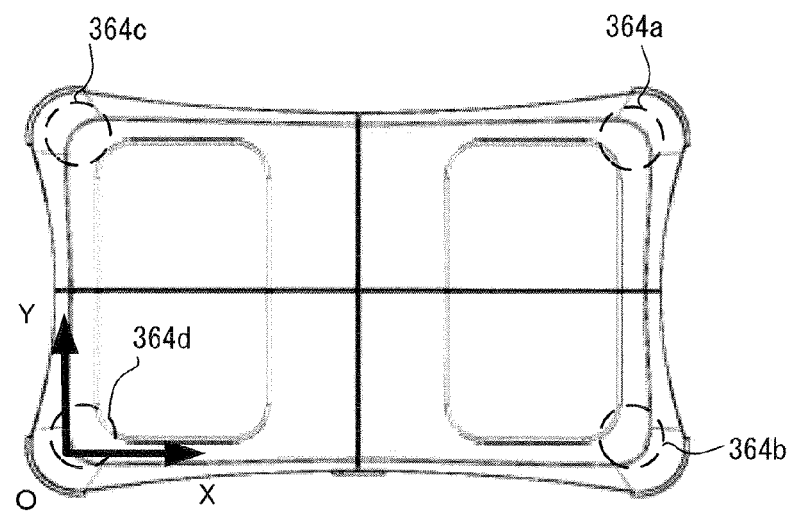
FIG. 7 is a diagram showing an XY coordinate system defining a gravity center position.

A game apparatus 12 calculates a gravity center position based on load values detected by respective load sensors 364 of the load controller 36. The gravity center position is indicated by a coordinate value on an XY coordinate system relative to the load controller 36. FIG. 7 shows the XY coordinate system which defines the gravity center position. As shown in FIG. 7, the origin of the XY coordinate system is set at the left bottom end portion of the load controller 36 (the end portion at which a load sensor 364d is provided). An X-axis is set in parallel to a long side direction of the load controller 36, and a Y-axis is set in parallel to a short side direction of the load controller 36. Accordingly, in the coordinate system defined as above, the gravity center position is calculated based on the load values detected by the respective load sensors 364.

Specifically, when a load value detected by a load sensor 364a is a, a load value detected by a load sensor 364b is b, a load value detected by a load sensor 364c is c, and a load value detected by the load sensor 364d is d, an X-coordinate value (XG) and a Y-coordinate value (YG) of a gravity center are calculated by the following formula 1 and formula 2.

$$XG = ((a+b-c-d)) \times m + \text{correction value} \quad (1)$$

$$YG = ((a+c-b-d)) \times n + \text{correction value} \quad (2)$$

Here, by setting constant numbers m, n, and a correction value, a gravity center position (XG, YG) is calculated by $0 \leq Xg \leq 1$, $0 \leq Yg \leq 1$. For example, the center of a platform 36a of the load controller 36 is represented by XG=0.5, YG=0.5. It is noted that the above formulas for the gravity center position are mere examples, and the gravity center position may be calculated by using other methods.

Figure 8:
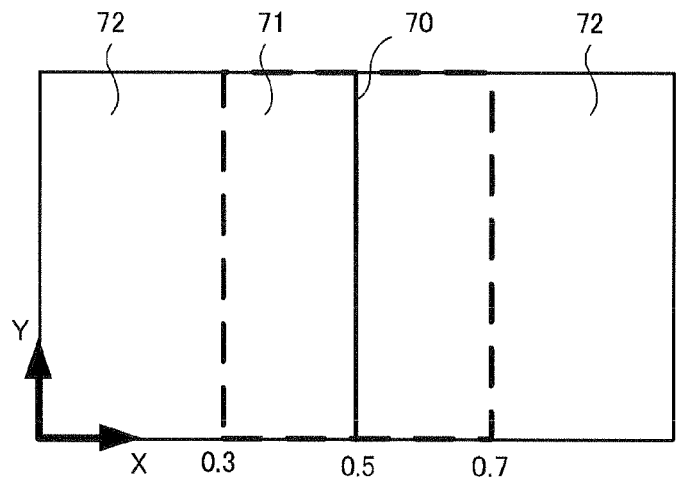
FIG. 8 is a diagram showing a reference line and respective regions defined on the XY coordinate system.

On an XY plane, a predetermined reference line and predetermined regions are defined. FIG. 8 shows a reference line and regions defined on the XY coordinate system. As shown in FIG. 8, a reference line 70, a region 71, and a region 72 are defined on the XY coordinate system. The reference line 70 is a straight line represented by X=0.5 (a line dividing the platform 36a of the load controller 36 into two equal parts, that is, the left part and the right part). The region 71 is a region which satisfies 0.3<X<0.7. The region 72 is a region a predetermined distance apart from the reference line 70, being separated into a region satisfying $0.0 \leq X \leq 0.3$ and a region satisfying $0.7 \leq X \leq 1.0$.

In the present embodiment, a musical piece is reproduced based on the gravity center position calculated as described above and the reference line 70. Specifically, when the user standing on the load controller 36 moves his/her weight in a right and left direction, each of measures of the musical piece is sequentially reproduced. More specifically, the game apparatus 12 reproduces each of the measures of the musical piece in accordance with the calculated gravity center position crossing the reference line 70. Further, the game apparatus 12 adjusts a sound volume of a measure to be reproduced in accordance with the gravity center position and the speed at which the gravity center position moves. Here, the speed of the gravity center (the moving speed of the gravity center position) is a distance (a distance in an X-axis direction) the gravity center moves in a unit time and is calculated by dividing the moving distance of the gravity center by time.

Figure 9:
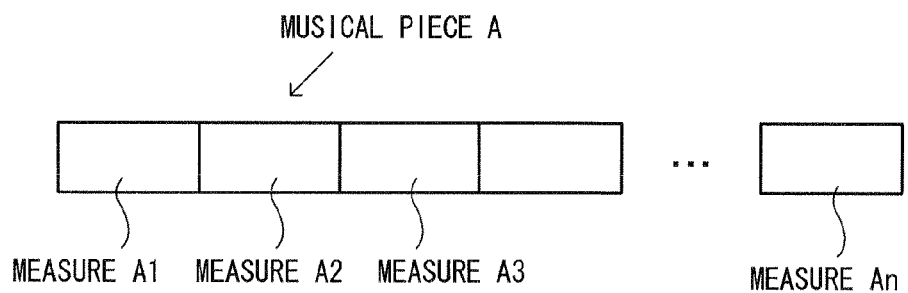
FIG. 9 is a figure showing a musical piece divided into a plurality of measures.
Figure 10:
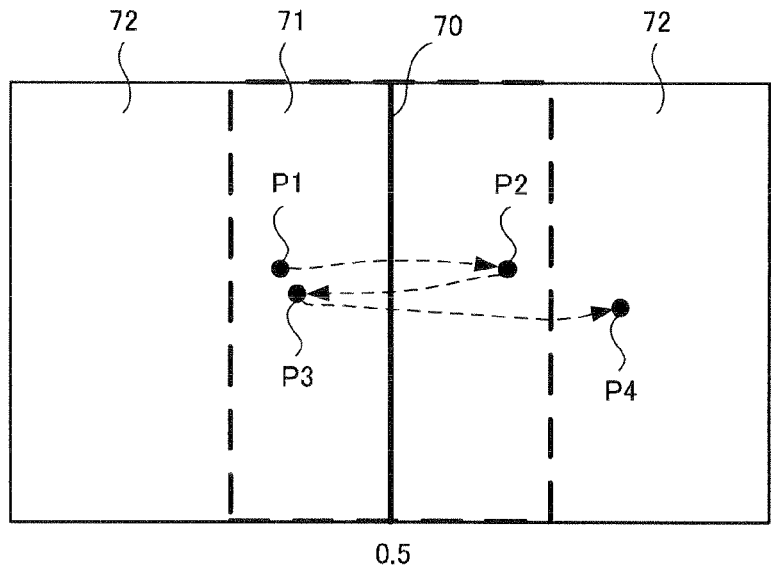
FIG. 10 is a figure showing a state where the gravity center position moves beyond a reference line 70.

FIG. 9 shows a musical piece divided into a plurality of measures. FIG. 10 shows a state where the gravity center position moves over the reference line 70. As shown in FIG. 9, a musical piece A is one piece of music as a whole and is divided into measures A1 to An (n is an integer). Each measure consists of a sequence of notes of an equal duration. When the user standing on the load controller 36 moves his/her weight in the right and left direction, the gravity center position moves as shown in FIG. 10. For example, when the user places his/her weight on the left foot and the right foot alternately, the gravity center position moves in the order of P1→P2→P3→P4 as shown in FIG. 10. In the game according to the present embodiment, each time the gravity center position moves beyond the reference line 70, a measure is reproduced. For example, as shown in FIG. 10, the measure Al is reproduced in accordance with the gravity center position having moved from the P1 to the P2. Next, in accordance with the gravity center position having moved from the P2 to the P3, the measure A2 is reproduced. Then, as the gravity center position moves from the P3 to the P4, the subsequent measure A3 is reproduced. Accordingly, in the game according to the present embodiment, each time the gravity center position moves beyond the reference line 70, a measure of the equal duration is reproduced. The user repeats a reciprocating motion of moving the gravity center position beyond the reference line 70 by moving his/her weight repeatedly in the right and left direction, thereby sequentially reproducing each of the measures.

Next, a volume control of each of measures to be sequentially reproduced will be described. A sound volume is changed in accordance with the gravity center position and the speed at which the gravity center position moves (the speed of the gravity center). Specifically, when the gravity center position is present within the region 71, the sound volume is determined in accordance with the gravity center position and the speed of the gravity center. When the gravity center position is present within the region 72, the sound volume is set to a maximum value. More specifically, when the gravity center position is present in the region 71, an upper limit of the sound volume is determined in accordance with a distance between the gravity center position and the reference line 70. Then, the sound volume is set to a value smaller than or equal to the determined upper limit in accordance with the speed of the gravity center.

Figure 11:
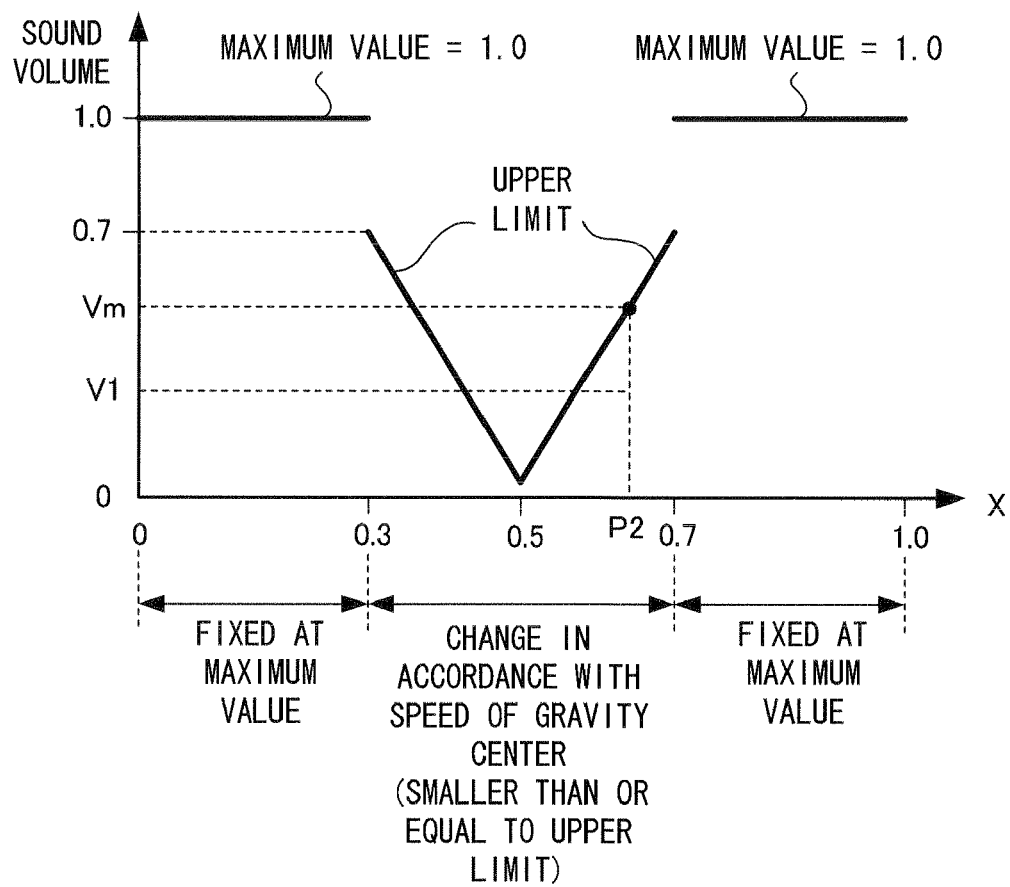
FIG. 11 is a figure showing a relationship between the gravity center position and a sound volume.

FIG. 11 shows a relation between the gravity center position and the sound volume. In FIG. 11, a horizontal axis indicates coordinate values of an X-axis while a vertical axis indicates the sound volume (0 to 1.0). As shown in FIG. 11, in a range of $0.0 \leq X \leq 0.3$ and a range of $0.7 \leq X \leq 1.0$, the sound volume is always set to the maximum value (1.0). In other words, when the gravity center position is present in the region 72, the sound volume is always set to the maximum value and a corresponding measure is reproduced.

Meanwhile, in a range of 0.3<X<0.7, the upper limit of the sound volume is set in accordance with a distance between the gravity center position and the reference line 70. Specifically, in a range of X being 0.5 to 0.7 as shown in FIG. 11, the upper limit of the sound volume is linearly set in a range of 0.05 to 0.7. The same applies to a range of X being 0.5 to 0.3. In this range, the sound volume is set smaller than or equal to a determined upper limit in accordance with the speed of the gravity center. More specifically, the sound volume is set so as to be closer to the upper limit as the speed of the gravity center increases, and, for example, the sound volume is set in proportion to the speed of the gravity center. For example, when the gravity center position is at the P2, and the speed of the gravity center is greater than or equal to a predetermined threshold value, the sound volume is set to an upper limit (Vm) which is determined in accordance with the gravity center position P2. Further, for example, when the speed of the gravity center is smaller than the predetermined threshold value, the sound volume is set to a value (V1) smaller than the upper limit (Vm) determined in accordance with the gravity center position P2.

Accordingly, the sound volume is set in accordance with the gravity center position and the speed of the gravity center, and music (each of the measures) is reproduced with the set sound volume.

As described above, in the present embodiment, each of the measures are sequentially reproduced in accordance with the gravity center position of the user having crossed the reference line. Accordingly, the user can reproduce music by moving his/her weight. Further, the user can feel as if he/she is actually performing a musical instrument (for example, a reed organ) which produces sounds by using his/her feet. Further, as described above, by setting the sound volume in accordance with the gravity center position and the speed of the gravity center, a strong stepping reproduces a loud sound. For example, because a musical instrument such as a reed organ reproduces a loud sound by a strong stepping, the user can feel as if he/she is actually performing the musical instrument such as a reed organ by changing the sound volume accordingly.

(Details of Game Process)

Next, details of the game process performed on the game apparatus 12 will be described with reference to FIGS. 12 to 13. First, main data used in the process performed on the game apparatus 12 will be described by referring to FIG. 12.

Figure 12:
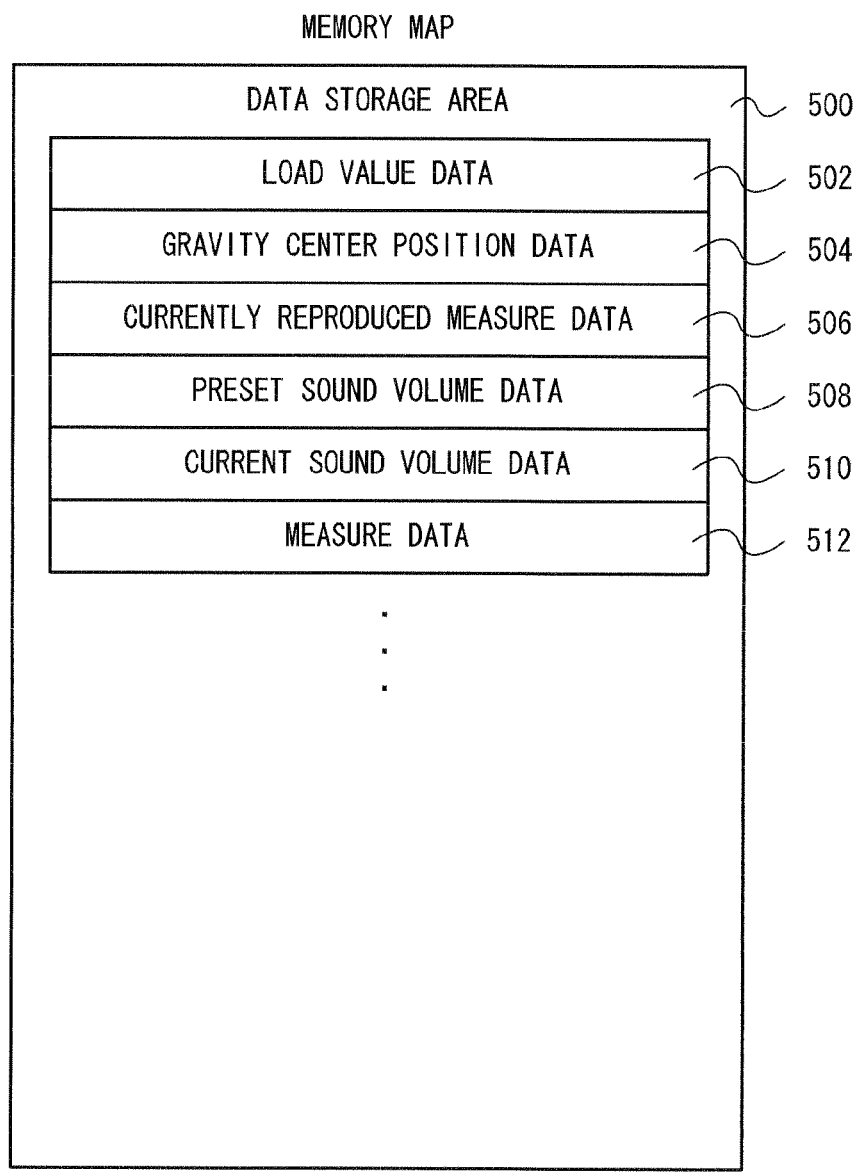
FIG. 12 is a figure showing main data stored in a main memory (an external main memory 46 or an internal main memory 42e) of a game apparatus 12.
Figure 13:
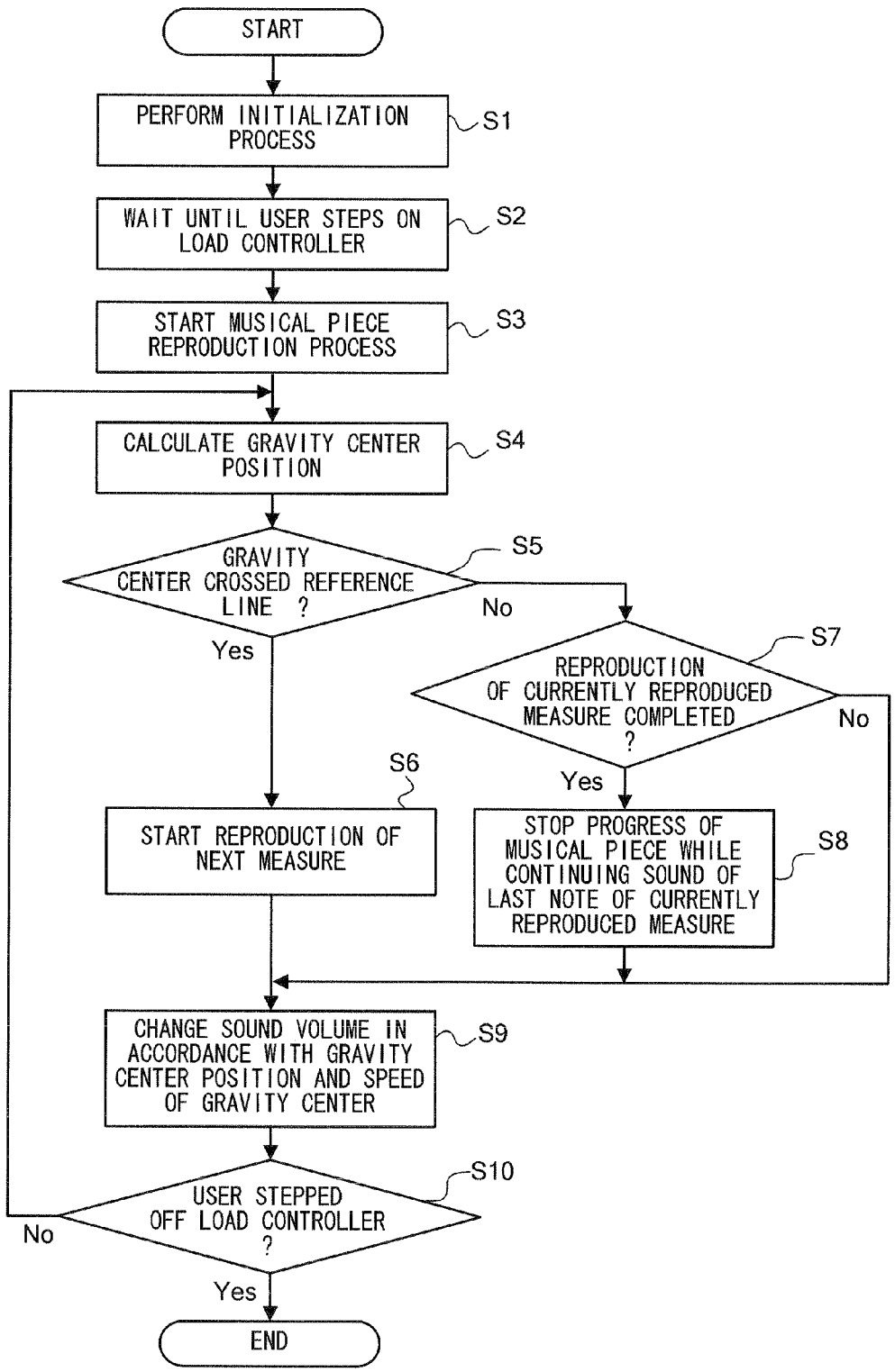
FIG. 13 is a flow chart showing a flow of game processing performed by a game apparatus 12 of a first embodiment.

FIG. 12 shows main data stored in a main memory (an external main memory 46 or an internal main memory 42e) of the game apparatus 12.

As shown in FIG. 12, in a data storage area 500 of the main memory of the game apparatus 12, load value data 502, gravity center position data 504, currently reproduced measure data 506, preset sound volume data 508, current sound volume data 510, and measure data 512 are stored. It is noted that, other than the data shown in FIG. 12, various data necessary for a game program (a music performance program) which performs the game process and other game processes are stored in the main memory.

The load value data 502 is data indicating load values detected by the respective load sensors 364 of the load controller 36. Specifically, the load value data 502 contains the load value detected by the load sensor 364a, the load value b detected by the load sensor 364b, the load value c detected by the load sensor 364c, and the load value d detected by the load sensor 364d. It is noted that the load controller 36 transmits data indicating load values detected by the respective load sensors 364a to 364d to the game apparatus 12, for example, every 1/200 seconds. On receipt of the data transmitted by the load controller 36, the game apparatus 12 (CPU 40) stores the received data in the main memory as the load value data 502.

The gravity center position data 504 is a collection of data respectively indicating the gravity center position calculated based on the load values detected by the respective load sensors 364a to 364d by the above formulas 1 and 2. Specifically, the gravity center position data 504 is an array, and data indicating the gravity center position is stored in each element of the array in chronological order.

The currently reproduced measure data 506 is data indicating a currently reproduced measure. Specifically, the currently reproduced measure data 506 is data indicating the measure number (1 to n) of the currently reproduced measure.

The preset sound volume data 508 is data indicating a set reproduction sound volume, and is a variable number which changes in a range of 0 to 1.0.

The current sound volume data 510 is data indicating a current reproduction sound volume, and a variable number which changes in a range of 0 to 1.0. As described below, as the sound volume is set (as the sound volume to be calculated in a process described later is set in the preset sound volume data 508), the sound volume is changed during the course of a predetermined time. The current sound volume data 510 is data indicating an actual current sound volume, and may be a value different from the sound volume indicated by the preset sound volume data 508.

The measure data 512 is a collection of music data respectively indicating the measures A1 to An.

Next, the game process performed by the game apparatus 12 will be described with reference to FIG. 13. FIG. 13 is a flow chart showing a flow of the game process according to the first embodiment performed by the game apparatus 12. When the game apparatus 12 is powered on, the CPU 40 of the game apparatus 12 executes a boot program stored in the ROM/RTC 48 to initialize each unit such as the external main memory 46. Then, the game program stored in the optical disc 18 is loaded to the main memory, and the CPU 40 starts executing the game program. The flow chart of FIG. 13 shows the game process performed after the above-described processing is completed. In FIG. 13, game processes which are not directly relevant to the present invention will not be described. A loop of processes at step S S4 to S10 shown in FIG. 13 is repeatedly performed once in each frame (for example, 1/60 sec; the above frame time).

First, in step S1, the CPU 40 performs an initialization process. In the initialization process, for example, zero-point compensation is performed. The zero-point compensation is a process of adjusting a load value detected by the load sensors 364 to 0 (kg) in a state (a state where nothing is put on the platform 36a) where no load is applied to the load sensors 364. Next, the CPU 40 performs a process of step S2.

In step S2, the CPU 40 waits until the user steps on the load controller. Specifically, the CPU 40 determines, with reference to the load value data 502, whether a sum of load values detected by the respective load sensors 364 is greater than or equal to a predetermined threshold value. The CPU 40 repeatedly performs the process until an affirmative determination result is obtained. When the sum of the load values is greater than or equal to the predetermined threshold value, the CPU 40 subsequently performs a process of step S3.

In step S3, the CPU 40 starts a musical piece reproduction process. Specifically, the CPU 40 starts reproduction of the first measure A1 of the musical piece A and simultaneously sets 1 in the currently reproduced measure data. Next, the CPU 40 performs a process of step S4.

In step S4, the CPU 40 calculates a gravity center position. Specifically, the CPU 40 obtains, with reference to the load value data 502, load values detected by the respective load sensors 364. By substituting the obtained load values respectively in the above formulas (1) and (2), the CPU 40 calculates a gravity center position G0 (XG0, YG0). Then, the CPU 40 stores the calculated gravity center position in the main memory as the gravity center position data 504. Next, the CPU 40 performs a process of step S5.

In step S5, the CPU 40 determines whether the gravity center has crossed the reference line 70. Specifically, the CPU 40 determines, with reference to the gravity center position data 504, whether the gravity center has moved beyond the reference line 70 based on a gravity center position G1 (XG1, YG1) calculated in step S4 of the previous frame (loop of processes) and the gravity center position G0 (XG0, YG0) calculated in step S4 of the current frame. For example, when $XG1 \leq 0.5$ and $XG0 > 0.5$, the CPU 40 determines that the gravity center position has crossed the reference line 70. Alternatively, the CPU 40 determines that the gravity center position has crossed the reference line 70 when $XG1 > 0.5$ and $XG0 \leq 0.5$. In other words, when the previous gravity center position G1 is present in a left-hand side region of the reference line 70, if the latest gravity center position G0 is present in a right-hand side region of the reference line 70, the CPU 40 determines that the gravity center position has crossed the reference line 70. Further, when the previous gravity center position G1 is present in the right-hand side region of the reference line 70, if the latest gravity center position G0 is present in the left-hand side region of the reference line 70, the CPU 40 determines that the gravity center position has crossed the reference line 70. When a result of the determination is affirmative, the CPU 40 subsequently performs a process of step S6. On the other hand, when the result of the determination is negative, the CPU 40 subsequently performs a process of step S7.

In step S6, the CPU 40 stops reproduction of the currently reproduced measure and starts reproduction of a next measure. Specifically, with reference to the currently reproduced measure data 506, the CPU 40 starts reproduction of a measure subsequent to the currently reproduced measure, and updates the currently reproduced measure data 506. Next, the CPU 40 performs a process of step S9.

In contrast, in step S7, the CPU 40 determines whether reproduction of the currently reproduced measure has been completed. Specifically, the CPU 40 determines whether an elapsed time since the reproduction of the measure has started which is indicated by the currently reproduced measure data 506 has exceeded a predetermined period of time. When a result of the determination is affirmative, the CPU 40 subsequently performs a process of step S8. When the result of the determination is negative, the CPU 40 subsequently performs a process of step S9.

In step S8, the CPU 40 stops the progress of the musical piece while continuing the sound of the last note of the currently reproduced measure. Next, the CPU 40 performs a process of step S9.

In step S9, the CPU 40 changes the reproduction sound volume in accordance with the gravity center position and the speed at which a gravity center moves (the speed of the gravity center). Specifically, the CPU 40 determines whether the current gravity center position G0 is present in the region 72 which is a predetermined distance or more apart from the reference line 70. When the gravity center position G0 is present in the region 72, the CPU 40 sets the sound volume to a maximum value (1.0) and stores the maximum value in the preset sound volume data 508.

When the gravity center position G0 is present in the region 71 which is within a predetermined distance from the reference line 70, the CPU 40 sets an upper limit (a range of 0.05 to 0.7) of the sound volume in accordance with the gravity center position G0, and sets the sound volume to a value smaller than or equal to the upper limit in accordance with the speed of the gravity center. For example, when the current gravity center position G0 is at the P2 as shown in FIG. 10, the CPU 40 sets an upper limit Vm at the gravity center position P2 based on a graph shown in FIG. 11. Then, the CPU 40 sets the sound volume in accordance with the speed of the gravity center. Specifically, the sound volume is set so as to be closer to the upper limit as the speed of the gravity center increases. For example, the CPU 40 calculates a value of the sound volume by multiplying the current speed of the gravity center by a predetermined constant number. It is noted that the speed of the gravity center is obtained by calculating a distance (a distance only in the X-axis direction) between a gravity center position at a frame predetermined frames before and the current gravity center position and dividing the calculated distance by the number of frames. Then, the CPU 40 stores the sound volume calculated accordingly in the main memory as the preset sound volume data 508.

Further, in step S9, the CPU 40 changes the current sound volume to the sound volume which is set as described above during the course of predetermined frames. Specifically, the CPU 40 determines the reproduction sound volume of a measure to be reproduced based on the value stored in the preset sound volume data 508 and the current sound volume stored in the current sound volume data 510. For example, the CPU 40 obtains a value by calculating a difference between the value of the current sound volume and the value stored in the preset sound volume data 508 and dividing the difference by the number of the predetermined frames. Then, by adding the value obtained by dividing the difference by the number of the predetermined frames to the current sound volume, the CPU 40 linearly changes the current sound volume to the value stored in the preset sound volume data 508. Accordingly, the CPU 40 updates the current sound volume data 510. Then, the CPU 40 reproduces a measure indicated by the currently reproduced measure data 506 with the reproduction sound volume in accordance with the updated value stored in the current sound volume data 510. It is noted that the current sound volume may be changed to the sound volume value stored in the preset sound volume data 508 in any manner and may be nonlinearly changed.

As described above, in step S9, the CPU 40 gradually changes the reproduction sound volume during the course of the predetermined frames. After step S9, the CPU 40 performs a process of step S10.

In step S10, the CPU 40 determines whether the user has stepped off the load controller 36. Specifically, with reference to the load value data 502, the CPU 40 determines whether a sum of load values detected by the respective load sensors 364 is less than a predetermined threshold value. When a result of the determination is negative, the CPU 40 performs the process of step S4 again. When the result of the determination is affirmative, on the other hand, the CPU 40 ends the processes shown in FIG. 13.

As described above, in the present embodiment, each of the measures are sequentially reproduced in accordance with the gravity center having moved beyond the reference line 70. The sound volume of a measure to be reproduced is changed in accordance with the gravity center position and the speed of the gravity center. Accordingly, the user can reproduce music while moving the gravity center, and the user can, for example, feel as if he/she is performing a musical instrument such as a reed organ by stepping with his/her feet.

In other words, the user can sequentially reproduce each of the measures of the musical piece by stepping on the load controller 36 alternately with his/her right foot and left foot. Further, in the above embodiment, a measure is reproduced with a louder sound volume as the speed of the gravity center increases and the distance between the gravity center position and the reference line 70 increases. In contrast, the measure is reproduced with a lower sound volume as the distance between the gravity center position and the reference line 70 decreases and the speed of the gravity center decreases (as the speed of the gravity center becomes closer to 0). Accordingly, when the user steps on the load controller 36 alternately with his/her right foot and left foot, as the stepping force increases (as the stepping speed increases), a measure is reproduced with a louder sound volume. Accordingly, in the same manner as that of an actual reed organ which procures a louder sound as the stepping force on the pedal increases, the reproduction sound volume can be adjusted.

Further, in the above embodiment, the sound volume is set in accordance with the gravity center position and the speed of the gravity center, and the sound volume is gradually changed to the set sound volume during the course of the predetermined frames (predetermined period of time). Accordingly, rapid change of the reproduction sound volume can be prevented. For example, when the sound volume is set to 0, the reproduction sound volume is changed to 0 during the course of the predetermined frames (the reproduction sound volume becomes gradually lower until it becomes silent). With this, a phenomenon similar to that in which the actual reed organ continues to produce a sound for a while even after stepping on the pedal ceased and the sound volume becomes gradually lower as time elapses can be realized, thereby enabling the user to feel as if he/she is actually performing a reed organ.

(Second Embodiment)

Next, a second embodiment of the present invention will be described. In the second embodiment, a game process is performed by using a game system similar to that of the above described first embodiment. Specifically, in the second embodiment, a reference line 70 is not set and each of measures is sequentially reproduced when a speed of a gravity center exceeds a first threshold value. In other words, in the second embodiment, regardless of whether the gravity center position exceeds the reference line 70 or not, each of the measures is sequentially reproduced at a constant speed when the speed of the gravity center exceeds the first threshold value. In other words, when a state in which the speed of the gravity center exceeds the first threshold value continues, each of the measures is sequentially reproduced at the constant speed thereby proceeding reproduction of a musical piece. In this case, a reproduction sound volume changes in accordance with the speed of the gravity center. Specifically, the reproduction sound volume is set so as to be increased in proportion to the speed of the gravity center. It is noted that the reproduction of the musical piece stops when the speed of the gravity center is too fast (when the speed of the gravity center exceeds a second threshold value (>a first threshold value).

(Details of Game Process)

In the following, details of the game process performed on a game apparatus 12 in the second embodiment will be described with reference to FIG. 14.

Figure 14:
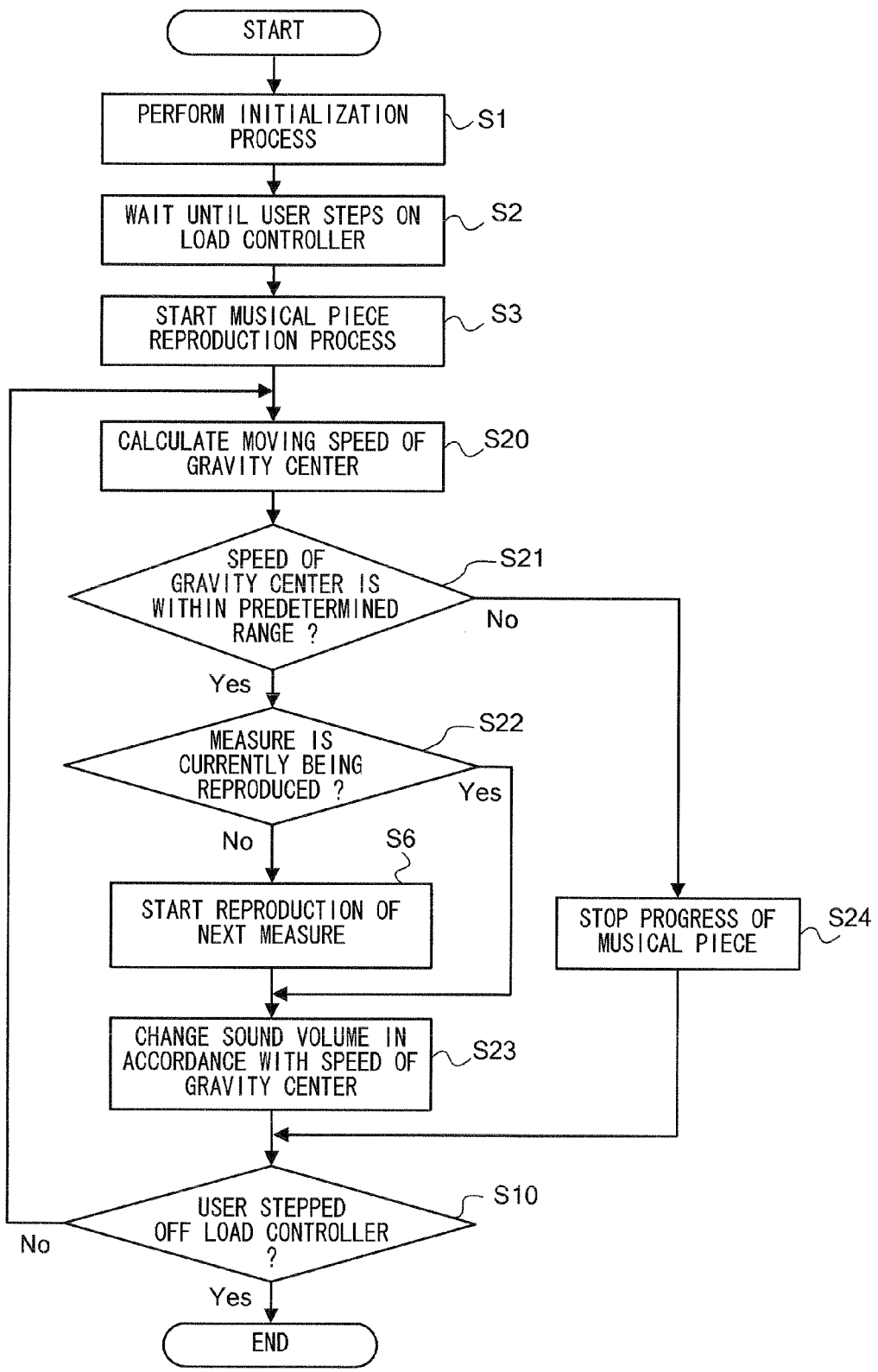
FIG. 14 is a flow chart showing a flow of game processing performed by a game apparatus 12 of a second embodiment.

FIG. 14 shows a flow chart of the game process performed on the game apparatus 12 of the second embodiment. In FIG. 14, processes similar to those of FIG. 13 are denoted by the same reference numerals and descriptions thereof are omitted.

First, processes of steps S1 to step S3 are performed. Then, a process of step S20 is performed. In step S20, a CPU 40 calculates a speed at which a gravity center moves (a speed of the gravity center). In a mariner similar to that of the first embodiment, the speed of the gravity center is obtained by calculating a distance (distance between only in the X-axis direction) between a gravity center position at a frame predetermined frames before and a current gravity center position and dividing the calculated distance by the number of frames. Next, the CPU 40 performs a process of step S21.

In step S21, the CPU 40 determines whether the speed of the gravity center is within a predetermined range. Specifically, the CPU 40 determines whether the speed of the gravity center calculated in step S20 is greater than the first threshold value and whether the speed of the gravity center is smaller than the second threshold value (>the first threshold value). When a result of the determination is affirmative, the CPU 40 subsequently performs a process of step S22. When the result of the determination is negative, the CPU 40 subsequently performs a process of step S24.

In step S22, the CPU 40 determines whether a measure is currently being reproduced. Specifically, the CPU 40 determines whether an elapsed time since the reproduction of the measure indicated by the currently reproduced measure data 506 has started is within a predetermined period of time. When a result of the determination is affirmative, the CPU 40 subsequently performs a process of step S23. When the result of the determination is negative, the when CPU 40 subsequently performs a process of step S6.

In step S23, the CPU 40 changes the reproduction sound volume in accordance with the speed of the gravity center. Specifically, the CPU 40 calculates a value of the sound volume by multiplying the speed of the gravity center calculated in step S20 by a predetermined constant number, and stores the calculated value in the main memory as the preset sound volume data 508. Next, the CPU 40 determines the reproduction sound volume of a measure to be reproduced based on the value stored in the preset sound volume data 508 and a value of the current sound volume stored in the current sound volume data 510. Specifically, in a similar manner as that of the above described step S9, the CPU 40 gradually changes the reproduction sound volume during the course of the predetermined frames. Then, the CPU 40 stores the determined reproduction sound volume in the main memory as the current sound volume data 510 and reproduces a measure indicated by the currently reproduced measure data 506 with the reproduction sound volume. After the process of step S23, the CPU 40 performs the process of step S10.

In contrast, in step S24, the CPU 40 stops the progress of the musical piece. That is, the CPU 40 stops the progress of the musical piece when the gravity center hardly moves (when the speed of the gravity center is smaller than or equal to the first threshold value), or when the speed of the gravity center is too fast (when the speed of the gravity center is greater than or equal to the second threshold value). Next, the CPU 40 performs the process of step S10. It is noted that in a case where the progress of the musical piece is stopped in step S24 and the speed of the gravity center falls within the predetermined range again, reproduction of a next measure subsequent to the stopped measure is started (step S6), thereby resuming the progress of the musical piece.

In the second embodiment, a musical piece may not be necessarily previously divided into a plurality of measures. In other words, the musical piece is configured as one musical piece without being previously divided into a plurality of measures. When the speed of the gravity center is within a predetermined range, the musical piece is sequentially reproduced while when the speed of the gravity center is not within the predetermined range, the reproduction of the musical piece may be stopped. Specifically, the processes of step S22 and step S6 may not be performed.

As described above, in the second embodiment, when the speed of the gravity center exceeds the first threshold value, each of the measures are sequentially reproduced. The reproduction sound volume of each of the measures is changed in accordance with the speed of the gravity center. Accordingly, the musical piece can be reproduced when the user move the gravity center. Further, in the second embodiment, a measure is reproduced with a louder sound volume as the speed of the gravity center increases. Accordingly, when the user steps on the load controller 36 alternately with his/her right foot and left foot, as the stepping force increases (as the stepping speed increases), a measure is reproduced with a louder sound volume. Accordingly, in the same manner as an actual reed organ which produces a louder sound as the stepping force on the pedal increases, the reproduction sound volume can be adjusted.

Further, in the above embodiment, the sound volume is set in accordance with the speed of the gravity center, and the sound volume is gradually changed into the set sound volume during the course of the predetermined frames (a predetermined time). Accordingly, rapid change of the reproduction sound volume can be prevented. For example, when the sound volume is set to 0, the reproduction sound volume is changed to 0 during the course of the predetermined frames (the reproduction sound volume becomes gradually lower until it becomes mute). With this, a phenomenon similar to that in which the actual reed organ continues to produce a sound for a while even after stepping on the pedal ceased and the sound volume becomes gradually lower as time elapses can be realized, thereby enabling the user to feel as if he/she is actually performing a reed organ.

(Modification)

In the first and the second embodiments, the musical piece A is divided into measures at regular intervals, and the measures are sequentially reproduced in accordance with movement of the gravity center. In another embodiment, a musical piece may be divided into each note, and each note may be sequentially reproduced in accordance with the movement of the gravity center. Further, in another embodiment, a musical piece may be divided into parts of different durations (predetermined intervals), and each of the parts may be sequentially reproduced in accordance with the movement of the gravity center.

Further, in the first and the second embodiment, a tempo of the musical piece (a reproduction speed of each of the measures) is constant. In another embodiment, the reproduction speed of each of the measures may be changed in accordance with a time period from a time of determination that the gravity center position has crossed the reference line 70 to a time of determination that the gravity center position has crossed the reference line 70 next. Specifically, the game apparatus 12 measures a time period from the time of determination that the gravity center position has crossed the reference line 70 to the time of determination that the gravity center position has crossed the reference line 70 next. Then, the game apparatus 12 may change the reproduction speed of each of the measures in accordance with the measured time. For example, the reproduction speed of each of the measures may be set so as to be faster, as the time period is shorter. Accordingly, the reproduction speed of each of the measures can be faster as the user moves his/her body faster in the right and left direction.

Further, in another embodiment, the tempo of the musical piece may be changed in accordance with the speed of the gravity center. In this case, for example, the tempo of the musical piece (the reproduction speed of each of the measures) may be set so as to be faster as the speed of the gravity center increases.

Figure 15:
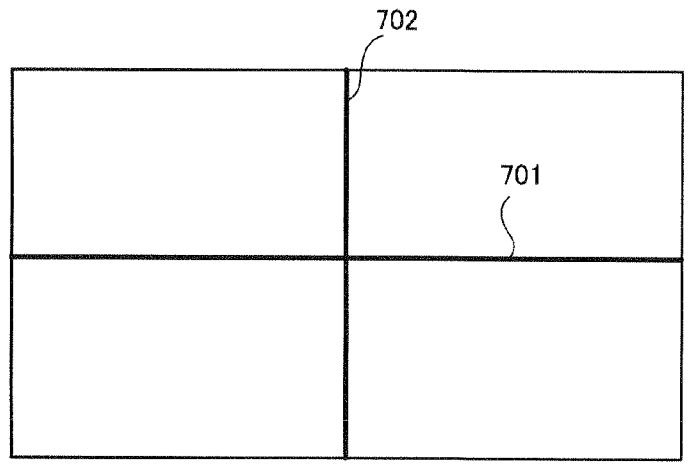
FIG. 15 shows another example of the reference line.
Figure 16:
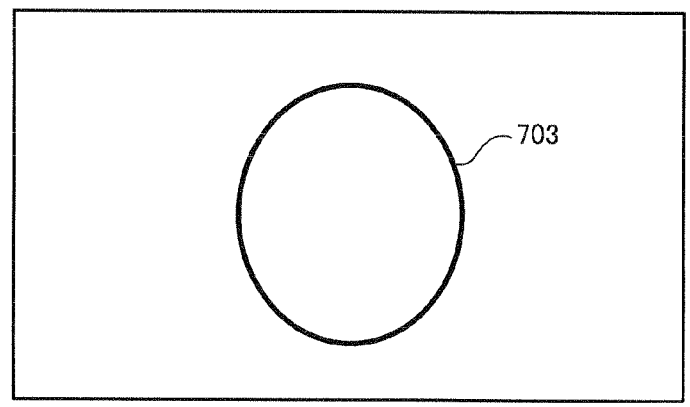
FIG. 16 shows another example of the reference line.
Figure 17:
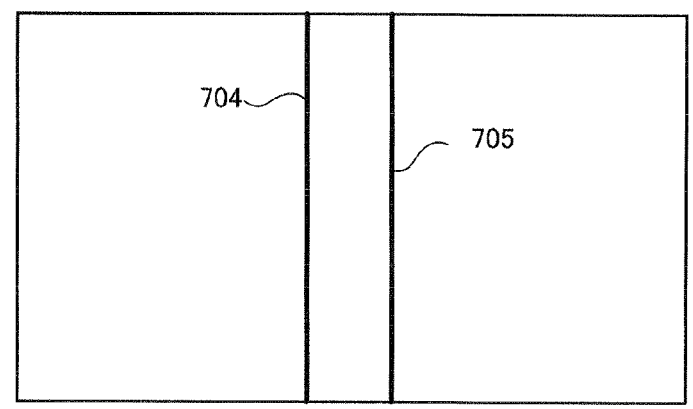
FIG. 17 shows another example of the reference line.

Further, in the first embodiment, measures are sequentially reproduced when the gravity center position moves beyond the reference line 70 which is a line dividing the load controller 36 into two equal parts, that is, the left part and the right part. In another embodiment, the reference line may be arrangement at any position or a plurality of reference lines may be set. Alternatively, the reference line is not limited to a straight line and may be a curved line. FIGS. 15 to 17 show other examples of the reference line. As shown in FIG. 15, the reference line may be defined as a line 701 dividing the load controller 36 into two equal parts, that is, the left part and the right part, and a line 702 dividing the load controller 36 into two equal parts, that is, the upper part and the lower part. Alternatively, as shown in FIG. 16, the reference line may be defined as a curved line 703. Alternatively, although not shown, the reference line may not necessarily be a straight line dividing the platform 36a of the load controller 36 into a plurality of regions, and may be a line segment not dividing the platform 36a into a plurality of regions (for example, the reference line may be defined as a line segment satisfying X=0.5 and 0.3<Y<0.7).

Alternatively, as shown in FIG. 17, the reference line may be defined as two lines 704 and 705 in parallel with the Y-axis. In this case, for example, a next measure may be reproduced when the gravity center position moves beyond the two lines 704 and 705. In other words, when the gravity center position moves to a region between the two lines 704 and 705 from the left-hand side region of the line 704, a next measure may not be reproduced. The next measure may be reproduced when the gravity center position moves further to the right-hand side region of the line 705. Accordingly, by defining the reference line as the two lines, a so-called allowable region can be provided, thereby preventing the measures of the musical piece from being proceeded one after another against the user's will while the gravity center position moves leftward and rightward near the reference line 70 as shown n in FIG. 10.

Further, in the first embodiment, each of the measures are sequentially reproduced in accordance with the gravity center position having moved beyond the reference line 70. In another embodiment, each of the measures may be reproduced by taking into account a moving direction of the gravity center position. FIG. 18 shows how each of the measures are sequentially reproduced in accordance with the moving direction in another embodiment. As shown in FIG. 18, for example, when the gravity center position move from one region (left side region) of two regions divided by the reference line 70 to the other region (right side region), a next measure is reproduced, while when the gravity center position moves from the right side region to the left side region, a next measure is not reproduce. In other words, the next measure may be reproduced only when the gravity center position moves from the one side (a left-hand side) beyond the reference line 70 to the other side (right-hand side). In this case, when the gravity center position moves from the other side beyond the reference line 70 to the one side, the currently reproduced measure may be continuously reproduced, or the currently reproduced measure may be stopped.

Further, in the first embodiment, the sound volume is set in accordance with the gravity center position and the speed of the gravity center for the region 71. In other words, an upper limit of the sound volume is set in accordance with the gravity center position being apart from the reference line 70, and the sound volume is set so as to be lower than or equal to the upper limit in accordance with the speed of the gravity center. In another embodiment, regardless of in which region the gravity center position is present, the sound volume may be set based on one of the gravity center position and the speed of the gravity center. For example, when the sound volume is set based only on the gravity center position, an upper limit indicated by a range of X being 0.3 to 0.7 as shown in FIG. 11 may be set as the sound volume (that is, the sound volume when the current gravity center position is at the P2 may be set to the Vm). Alternatively, for example, the sound volume may be set based only on the speed of the gravity center.

Further, in the first embodiment, the sound volume is set so as to be increased as the distance between the gravity center position and the reference line 70 increases. In another embodiment, however, the sound volume may be set so as to be decreased as the distance between the gravity center position and the reference line 70 increases. Accordingly, the sound volume may be set based on a positional relationship between the gravity center position and the reference line. Further, in the first embodiment, the sound volume is set so as to be increased as the speed of the gravity center increases, however, the sound volume may best so as to be decreased as the speed of the gravity center increases.

Further, in the first embodiment, each of the measures are sequentially reproduced in accordance with the gravity center having moved beyond the reference line, while in the second embodiment, each of the measures are sequentially reproduced when the speed of the gravity center is greater than or equal to the predetermined value. In another embodiment, a condition of determining whether to reproduce a next measure is not limited thereto. In other words, in the above embodiment, a musical instrument such as a reed organ is assumed and it is determined whether the gravity center position has moved in a manner similar to that of stepping operation in a reed organ, thereby controlling the progress of a musical piece. In another embodiment, another specific musical instrument may be assumed and it is determined whether the gravity center position has moved in a manner similar to that of an operation of the musical instrument, thereby controlling the progress of the musical piece. Alternatively, the progress of the musical piece may be controlled in accordance with the movement of the gravity center position without assuming a specific musical instrument.

For example, whether the gravity center position moves in a predetermined pattern can be determined. When a result of the determination is affirmative, a next measure may be reproduced. For example, whether the gravity center position moves such that a circle or an ellipse is drawn is determined, and a next measure may be sequentially reproduced every time the gravity center position moves such that a circle or an ellipse is drawn. Alternatively, for example, whether the gravity center position repeats a reciprocating movement of moving in a predetermined direction is determined. When the gravity center position repeats the reciprocating movement, each of the measures may be sequentially reproduced. Such a moving pattern of the gravity center is basically the same as the moving pattern of the gravity center described in the example of the reed organ in the first and the second embodiments, and only a determination method for the movement of the gravity center is different. In other words, in the first embodiment, whether the gravity center position repeats the reciprocating movement in the right and left direction is determined by using the reference line. In another embodiment, however, the moving pattern of the gravity center may be determined by using another method. For example, whether the moving direction of the gravity center is reversed (that is, whether the moving direction of the current gravity center is different by substantially 180 degrees from the moving direction of the previous gravity center) is determined. When a result of the determination is affirmative, a next measure may be sequentially reproduced.

As described above, in another embodiment, whether the movement of the gravity center position satisfies a predetermined condition and each of the measures may be sequentially reproduced every time a result of the determination is affirmative. Here, the determination of whether the movement of the gravity center position satisfies the predetermined condition may be determination of, for example, whether the gravity center position move beyond the reference line, or determination of whether the speed of the gravity center is greater than or equal to a predetermined value. The determination of whether the movement of the gravity center position satisfies the predetermined condition may be determination of, for example, whether the gravity center position moves in a predetermined pattern.

In the present embodiment, the above processes are performed by using the load controller 36 having the four load sensors 364. In another embodiment, the number of the load sensors may not be necessarily four, but may be three, or five or more. Further, the four load sensors 364 are not necessarily arranged at four corners of the load controller 36 but may be arranged in any manner. In short, the number of the load sensors and the manner of arrangement may be arbitrary, and the gravity center position can be calculated by performing a correction unique to a geometric arrangement of the load sensors.

In the present embodiment, data indicating the load values detected by the respective load sensors 364 are transmitted to the game apparatus 12. In another embodiment, the load controller 36 may calculate the sum of the loads values detected by the respective load sensors 364 and the gravity center position, and may transmit the calculated sum and the calculated gravity center position, to the game apparatus 12. In other words, the game apparatus 12 may receive a signal including the total load value and the gravity center position calculated by the load controller 36 and obtain these pieces of information from the received signal.

The game program according to example embodiments of the present invention may be provided to the game apparatus 12 not only through an external storage medium such as the optical disc 18 but also through a wired or wireless communication line. Alternatively, the game program may be previously stored in a nonvolatile storage device provided in the game apparatus 12. It is noted that an information storage medium (a computer-readable storage medium) having a game program stored therein may be a nonvolatile semiconductor memory in addition to an optical disc-shaped storage medium such as CD-ROM, DVD, and the like.

The above described program may be executed on an information processing device other than the game apparatus 12 such as a personal computer having a special device for performing music and a device capable of measuring a load and the like.

The above described music performance method may be realized by an information process system having a plurality of devices connected thereto in a wired or wireless manner. For example, a load measuring device which measures a load and an information processing device may be locally connected, and the information processing device may be connected with a server having musical pieces stored therein via a network connection such as an internet connection. Then, the information processing device may download a musical piece from the server and sequentially reproduce the downloaded musical piece in accordance with a signal received from the load measuring device.

In the present embodiment, the processes following the above described flow chart are performed by the CPU 40 of the game apparatus 12 executing the game program. In another embodiment, a part or all of the above described processes may be performed by a special circuit provided in the game apparatus 12.

Example embodiments of present invention has been described in detail, however, the above description is in all aspects only illustrative and not restrictive. It is understood that numerous other modifications and variations can be devised without departing from the scope of the invention.

What is claimed is:

1. A non-transitory computer-readable storage medium having stored therein a music performance program executed on a computer of a music performance apparatus which processes a signal from a load measuring device having a load sensor, the program causing the computer to provide functionality comprising:
    a gravity center position obtainment which repeatedly obtains a gravity center position based on a signal from the load measuring device;
    a determination which determines whether a movement of the gravity center position obtained by the gravity center position obtainment satisfies a predetermined condition; and
    a music reproduction which sequentially reproduces a predetermined musical piece each time the determination determines that the movement of the gravity center position satisfies the predetermined condition.

2. The non-transitory computer-readable storage medium having stored therein the music performance program according to claim 1, wherein
    the determination determines whether to reproduce the predetermined musical piece in accordance with the gravity center position obtained by the gravity center position obtainment having moved beyond a predetermined reference line, and the music reproduction sequentially reproduces the predetermined musical piece for a predetermined time each time the determination determines to reproduce the predetermined musical piece.

3. The non-transitory computer-readable storage medium having stored therein the music performance program according to claim 1, wherein
the determination determines whether a moving speed of the gravity center position calculated based on the gravity center position obtained by the gravity center position obtainment is greater than or equal to a predetermined value, and
the music reproduction sequentially reproduces the predetermined musical piece when the determination determines that the moving speed of the gravity center position is greater than or equal to the predetermined value.

4. The non-transitory computer-readable storage medium having stored therein the music performance program according to claim 1, the program causing the computer to provide further functionality comprising a sound volume setting which sets a reproduction sound volume of the predetermined musical piece by using the gravity center position obtained by the gravity center position obtainment, wherein
the music reproduction reproduces the predetermined musical piece with the reproduction sound volume set by the sound volume setting.

5. The non-transitory computer-readable storage medium having stored therein the music performance program according to claim 2, the program causing the computer to provide further functionality comprising a sound volume setting which sets a reproduction sound volume of the predetermined musical piece based on a positional relationship between the predetermined reference line and the gravity center position obtained by the gravity center position obtainment, wherein
the music reproduction reproduces the predetermined musical piece with the reproduction sound volume set by the sound volume setting.

6. The non-transitory computer-readable storage medium having stored therein the music performance program according to claim 5, wherein the sound volume setting sets the reproduction sound volume so as to be increased as a distance between the predetermined reference line and the gravity center position increases.

7. The non-transitory computer-readable storage medium having stored therein the music performance program according to claim 5, wherein the sound volume setting sets, when the gravity center position is not within a predetermined region that includes the predetermined reference line, the reproduction sound volume to a first sound volume; and sets, when the gravity center position is within the predetermined region, the reproduction sound volume to a sound volume which is lower than the first sound volume.

8. The non-transitory computer-readable storage medium having stored therein the music performance program according to claim 5, wherein the sound volume setting determines a sound volume upper limit in accordance with the distance between the predetermined reference line and the gravity center position; and sets the reproduction sound volume so as to be within the sound volume upper limit in accordance with a moving speed of the gravity center position calculated based on the gravity center position obtained by the gravity center position obtainment.

9. The non-transitory computer-readable storage medium having stored therein the music performance program according to claim 4, wherein the sound volume setting sets the reproduction sound volume in accordance with a moving speed of the gravity center position calculated based on the gravity center position obtained by the gravity center position obtainment.

10. The non-transitory computer-readable storage medium having stored therein the music performance program according to claim 9, wherein the sound volume setting sets the reproduction sound volume so as to be increased as the moving speed of the gravity center position increases.

11. The non-transitory computer-readable storage medium having stored therein the music performance program according to claim 4, wherein the music reproduction changes a current reproduction sound volume gradually to the reproduction sound volume set by the sound volume setting during the course of a predetermined time, and reproduces the predetermined musical piece.

12. The non-transitory computer-readable storage medium having stored therein the music performance program acceding to claim 1, the program causing the computer to provide further functionality comprising a reproduction speed setting which sets a reproduction speed of the predetermined musical piece based on a moving speed of the gravity center position calculated based on the gravity center position obtained by the gravity center position obtainment, wherein
the music reproduction reproduces the predetermined musical piece at the reproduction speed set by the reproduction speed setting.

13. The non-transitory computer-readable storage medium having stored therein the music performance program according to claim 12, wherein the reproduction speed setting sets the reproduction speed so as to be increased as the moving speed of the gravity center position increases.

14. The non-transitory computer-readable storage medium having stored therein the music performance program acceding to claim 2, the program causing the computer to provide further functionality comprising: a time measurement which measures a time period starting from when the determination previously determines to reproduce the predetermined musical piece to when the determination determines to reproduce the predetermined musical piece next time; and
a reproduction speed setting which sets a reproduction speed of the predetermined musical piece based on the time period measured by the time measurement, wherein
the music reproduction reproduces the predetermined musical piece at the reproduction speed set by the reproduction speed setting.

15. The non-transitory computer-readable storage medium having stored therein the music performance program according to claim 14, wherein the reproduction speed setting sets the reproduction speed so as to be increased as the time period measured by the time measurement decreases.

16. The non-transitory computer-readable storage medium having stored therein the music performance program according to claim 2, wherein the determination determines, in a situation where the gravity center position moves beyond the predetermined reference line, to reproduce the predetermined musical piece only when the gravity center position moves from one side to the other side beyond the predetermined reference line.

17. The non-transitory computer-readable storage medium having stored therein the music performance program according to claim 1, the program causing the computer to provide further functionality comprising a load value obtainment which repeatedly obtains a load value on the load measuring device based on the signal from the load measuring device, wherein the music reproduction reproduces the predetermined musical piece only when the load value obtained by the load value obtainment is greater than or equal to a predetermined value.

18. The non-transitory computer-readable storage medium having stored therein the music performance program according to claim 1, wherein
the music reproduction sequentially reproduces the predetermined musical piece for a predetermined time each time the determination determines that the movement of the gravity center position satisfies the predetermined condition.

19. The non-transitory computer-readable storage medium having stored therein the music performance program according to claim 1, wherein the predetermined musical piece is divided at regular intervals.

20. The non-transitory computer-readable storage medium having stored therein the music performance program according to claim 1, wherein the predetermined musical piece is divided into each note, and
the music reproduction sequentially reproduces each note of the predetermined musical piece each time the determination determines to reproduce the predetermined musical piece.

21. The non-transitory computer-readable storage medium having stored therein the music performance program according to claim 1, wherein the load measuring device includes a plurality of load sensors, and
the gravity center position obtainment calculates the gravity center position based on the load value detected by each of the plurality of load sensors.

22. A music performance apparatus which processes a signal from a load measuring device having a load sensor, the apparatus comprising:
a gravity center position obtaining unit which repeatedly obtains a gravity center position based on a signal from the load measuring device;
a determination unit which determines whether a movement of the gravity center position obtained by the gravity center position obtaining unit satisfies a predetermined condition; and
a music reproduction unit which sequentially reproduces a predetermined musical piece each time the determination unit determines that the movement of the gravity center position satisfies the predetermined condition.

23. A music performance system which processes a signal from a load measuring device having a load sensor, the system comprising:
a processing system including at least one computer processor, the processing system being configured at least to:
repeatedly obtain a gravity center position based on a signal from the load measuring device;
determine whether a movement of the obtained gravity center position satisfies a predetermined condition; and
sequentially reproduce a predetermined musical piece each time the determination is made that the movement of the gravity center position satisfies the predetermined condition.

24. A music performance method comprising:
repeatedly obtaining a gravity center position based on a signal from a load measuring device having a load sensor;
determining whether a movement of the obtained gravity center position satisfies a predetermined condition; and
sequentially reproducing the predetermined musical piece each time it is determined that the movement of the gravity center position satisfies the predetermined condition in said determining.

* * * * *